United States Patent
Warner et al.

(10) Patent No.: US 11,427,673 B2
(45) Date of Patent: Aug. 30, 2022

(54) ALTERNATIVE CROSSLINKING MECHANISMS FOR POLYURETHANE-BASED SYSTEMS

(71) Applicant: COVESTRO LLC, Pittsburgh, PA (US)

(72) Inventors: John Warner, Wilmington, MA (US);
Carmen Baldino, Woburn, MA (US);
Justin Whitfield, Billerica, MA (US);
Frederick Richard Kearney, Walpole, MA (US)

(73) Assignee: Covestro LLC, Pittsburgh, PA (US)

( * ) Notice: Subject to any disclaimer, the term of this patent is extended or adjusted under 35 U.S.C. 154(b) by 504 days.

(21) Appl. No.: 16/269,606

(22) Filed: Feb. 7, 2019

(65) Prior Publication Data
US 2020/0255578 A1    Aug. 13, 2020

(51) Int. Cl.
*C08G 18/34*    (2006.01)
*C08G 18/16*    (2006.01)
(Continued)

(52) U.S. Cl.
CPC ......... *C08G 18/348* (2013.01); *C08G 18/165* (2013.01); *C08G 18/168* (2013.01);
(Continued)

(58) Field of Classification Search
None
See application file for complete search history.

(56) References Cited

U.S. PATENT DOCUMENTS

| 6,051,674 A | * | 4/2000 | Yezrielev | ........... C08G 18/3221 |
| | | | | 525/123 |
| 2016/0235062 A1 | * | 8/2016 | Bergmann | ............. A01N 43/36 |

FOREIGN PATENT DOCUMENTS

| CN | 108395512 A | * | 8/2018 | ......... C08G 18/3215 |
| DE | 10003157 A1 | * | 8/2001 | ............. B01J 20/26 |

(Continued)

OTHER PUBLICATIONS

"Isatin-N-carboxamides and their reactions," Justus Liebigs Annalen der Chemie (1975), vol. 12, pp. 2003-2014 (1975) (Year: 1975).*

*Primary Examiner* — Randy P Gulakowski
*Assistant Examiner* — Ha S Nguyen
(74) *Attorney, Agent, or Firm* — Richard P. Bender; John E. Mrozinski, Jr.

(57) ABSTRACT

The present invention provides compositions comprising the reaction product of an aliphatic diisocyanate, and a reactive intermediate made from one selected from the group consisting of oxazolidinones, benzoic sulfimides (saccharins), 1H-indole-2,3-diones (isatins), succinamides, N-hydroxysuccinamides, 4-hydroxy-3-methoxybenzaldehydes (vanillins), α-ketoamides, piperazines, benzofuranones, 3,4-dihydroxycyclobut-3-ene-1,2-diones (squaric acids), squaric acid esters, α-ketoamides, anilines, and α-ketoamide, phenols. The aliphatic diisocyanate comprises one selected from the group consisting of isocyanurates, biurets, iminooxadiazine diones, urethanes, uretdiones, carbodiimides, and allophanates. The resulting compositions may be useful in producing coatings, adhesives, sealants, castings, composites and films having durability, color stability, high gloss, and chemical resistance properties similar to those made from polyurethane.

21 Claims, 3 Drawing Sheets

(51) Int. Cl.

| | | |
|---|---|---|
| *C08G 18/20* | (2006.01) | |
| *C08G 18/22* | (2006.01) | |
| *C08G 18/24* | (2006.01) | |
| *C08G 18/50* | (2006.01) | |
| *C08G 18/62* | (2006.01) | |
| *C08G 18/73* | (2006.01) | |
| *C09D 175/04* | (2006.01) | |
| *C09J 175/04* | (2006.01) | |
| *C08G 18/28* | (2006.01) | |
| *C08G 18/75* | (2006.01) | |
| *C08G 18/79* | (2006.01) | |
| *C08G 18/38* | (2006.01) | |
| *C08G 18/78* | (2006.01) | |
| *C08G 18/65* | (2006.01) | |

(52) U.S. Cl.
CPC ....... *C08G 18/2063* (2013.01); *C08G 18/222* (2013.01); *C08G 18/242* (2013.01); *C08G 18/5024* (2013.01); *C08G 18/6241* (2013.01); *C08G 18/6541* (2013.01); *C08G 18/73* (2013.01); *C09D 175/04* (2013.01); *C09J 175/04* (2013.01)

(56) References Cited

FOREIGN PATENT DOCUMENTS

| EP | 0661278 A1 | * | 7/1995 | ........... C08G 18/798 |
| JP | 2002331762 A | * | 11/2002 | ........ B41M 5/3335 |
| JP | 2016069496 A | * | 5/2016 | |
| SU | 520350 A | * | 11/1976 | |

* cited by examiner

ALTERNATIVE CROSSLINKING MECHANISMS FOR POLYURETHANE-BASED SYSTEMS

FIELD OF THE INVENTION

The present invention relates in general to, polymers and more specifically to compositions useful in the production of curable compositions such as coatings, adhesives, castings, composites, films, and sealants.

BACKGROUND OF THE INVENTION

Polyurethane-forming compositions are widely used in a wide variety of commercial, industrial and household applications including foams, insulation and coatings. Two-component polyurethanes are used for production of high performance protective coatings used in automotive, aerospace, and corrosion protection applications. Such coatings dominate many markets because of their unmatched physical and chemical properties. Aliphatic polyurethanes are considered very high quality coatings for applications that require outdoor durability, color stability, high gloss, and exceptional chemical resistance. Due to potential concerns about the components that are used in the standard routes to make polyurethane materials, alternative crosslinking agents to crosslink isocyanate-reactive functional groups are desirable. Such crosslinking materials should produce materials which retain the durability, hardness, toughness, color stability, high gloss, and chemical resistance properties of state of the art polyurethane coatings, adhesives, castings, composites, films, and sealants.

Therefore, a need continues to exist in the art for alternative cross-linking approaches to obtain curable compositions having physical properties similar to those made from polyurethane.

SUMMARY OF THE INVENTION

Accordingly, the present invention provides a composition comprising the reaction product of an aliphatic diisocyanate, and a reactive intermediate made from one selected from the group consisting of oxazolidinones, benzoic sulfimides (saccharins), 1H-indole-2,3-diones (isatins), succinamides, N-hydroxysuccinamides, 4-hydroxy-3-methoxybenzaldehydes (vanillins), α-ketoamides, piperazines, benzofuranones, 3,4-dihydroxycyclobut-3-ene-1,2-diones (squaric acids), squaric acid esters, α-ketoamides, anilines, and α-ketoamide, phenols. The aliphatic diisocyanate comprises one selected from the group consisting of isocyanurates, biurets, iminooxadiazine diones, urethanes, uretdiones, carbodiimides, and allophanates.

The inventive compositions may be used to produce curable compositions such as coatings, adhesives, sealants, castings, composites and films having durability, color stability, high gloss, and chemical resistance properties similar to those made from polyurethane.

These and other advantages and benefits of the present invention will be apparent from the Detailed Description of the Invention herein below.

BRIEF DESCRIPTION OF THE FIGURES

The present invention will now be described for purposes of illustration and not limitation in conjunction with the figures, wherein.

DETAILED DESCRIPTION OF THE INVENTION

Figure 1:
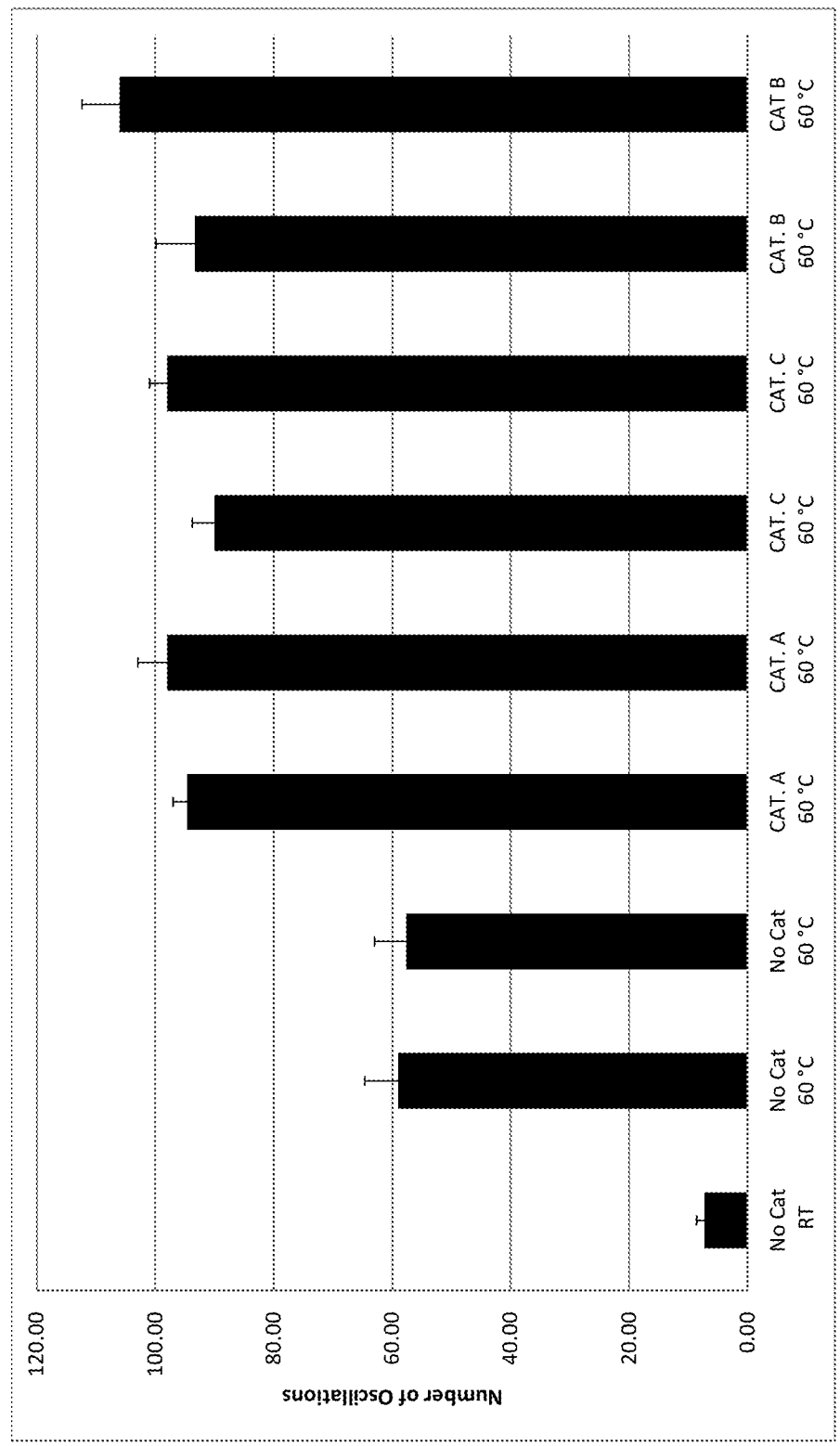
FIG. 1 shows 3° König Pendulum Hardness for a coating made from N-hydroxysuccinamide.

The present invention will now be described for purposes of illustration and not limitation. Except in the operating examples, or where otherwise indicated, all numbers expressing quantities, percentages, and so forth in the specification are to be understood as being modified in all instances by the term "about."

Any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112(a), and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Reference throughout this specification to "various non-limiting embodiments," "certain embodiments," or the like, means that a particular feature or characteristic may be included in an embodiment. Thus, use of the phrase "in various non-limiting embodiments," "in certain embodiments," or the like, in this specification does not necessarily refer to a common embodiment, and may refer to different embodiments. Further, the particular features or characteristics may be combined in any suitable manner in one or more embodiments. Thus, the particular features or characteristics illustrated or described in connection with various or certain embodiments may be combined, in whole or in part, with the features or characteristics of one or more other embodiments without limitation. Such modifications and variations are intended to be included within the scope of the present specification.

The grammatical articles "a", "an", and "the", as used herein, are intended to include "at least one" or "one or more", unless otherwise indicated, even if "at least one" or "one or more" is expressly used in certain instances. Thus, these articles are used in this specification to refer to one or more than one (i.e., to "at least one") of the grammatical objects of the article. By way of example, and without limitation, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

As used herein, the term "polymer" encompasses pre-polymers, oligomers and both homopolymers and copolymers; the prefix "poly" in this context referring to two or more. As used herein, the term "molecular weight", when used in reference to a polymer, refers to the number average molecular weight, unless otherwise specified.

As used herein, the term "coating composition" refers to a mixture of chemical components that will cure and form a coating when applied to a substrate.

The terms "adhesive" or "adhesive compound", refer to any substance that can adhere or bond two items together. Implicit in the definition of an "adhesive composition" or "adhesive formulation" is the concept that the composition or formulation is a combination or mixture of more than one species, component or compound, which can include adhesive monomers, oligomers, and polymers along with other materials.

A "sealant composition" or "sealant" refers to a composition which may be applied to one or more surfaces to form a protective barrier, for example to prevent ingress or egress of solid, liquid or gaseous material or alternatively to allow selective permeability through the barrier to gas and liquid. In particular, it may provide a seal between surfaces.

A "casting composition" or "casting" refers to a mixture of liquid chemical components which is usually poured into a mold containing a hollow cavity of the desired shape, and then allowed to solidify.

A "composite" refers to a material made from two or more polymers, optionally containing other kinds of materials. A composite has different properties from those of the individual polymers/materials which make it up.

A "film" refers to a thin coating or layer of polymeric material.

A "catalyst" refers to a substance that speeds up a chemical reaction, but is not itself consumed by the reaction.

"Cured," "cured composition" or "cured compound" refers to components and mixtures obtained from reactive curable original compound(s) or mixture(s) thereof which have undergone a chemical and/or physical changes such that the original compound(s) or mixture(s) is(are) transformed into a solid, substantially non-flowing material. A typical curing process may involve crosslinking.

The term "curable" means that an original compound(s) or composition material(s) can be transformed into a solid, substantially non-flowing material by means of chemical reaction, crosslinking, radiation crosslinking, or the like. Thus, compositions of the invention are curable, but unless otherwise specified, the original compound(s) or composition material(s) is(are) not cured.

The present invention provides a composition comprising the reaction product of an aliphatic diisocyanate, and a reactive intermediate made from one selected from the group consisting of oxazolidinones, benzoic sulfimides (saccharins), 1H-indole-2,3-diones (isatins), succinamides, N-hydroxysuccinamides, 4-hydroxy-3-methoxybenzaldehydes (vanillins), α-ketoamides, piperazines, benzofuranones, 3,4-dihydroxycyclobut-3-ene-1,2-diones (squaric acids), squaric acid esters, α-ketoamides, anilines, and α-ketoamide, phenols. The aliphatic diisocyanate comprises one selected from the group consisting of isocyanurates, biurets, iminooxadiazine diones, urethanes, uretdiones, carbodiimides, and allophanates.

The inventive compositions may be used to produce curable compositions such as coatings, adhesives, sealants, castings, composites and films having durability, color stability, high gloss, and chemical resistance properties similar to those made from polyurethane.

In one aspect, the invention is directed to a curable composition comprising the reaction product of N-[6-[3,5-bis[6-[[4-(2-ethoxy-3,4-dioxo-cyclobuten-1-yl)piperazine-1-carbonyl]amino]hexyl]-2,4,6-trioxo-1,3,5-triazinan-1-yl]hexyl]-4-(2-ethoxy-3,4-dioxo-cyclobuten-1-yl)piperazine-1-carboxamide (Formula II),

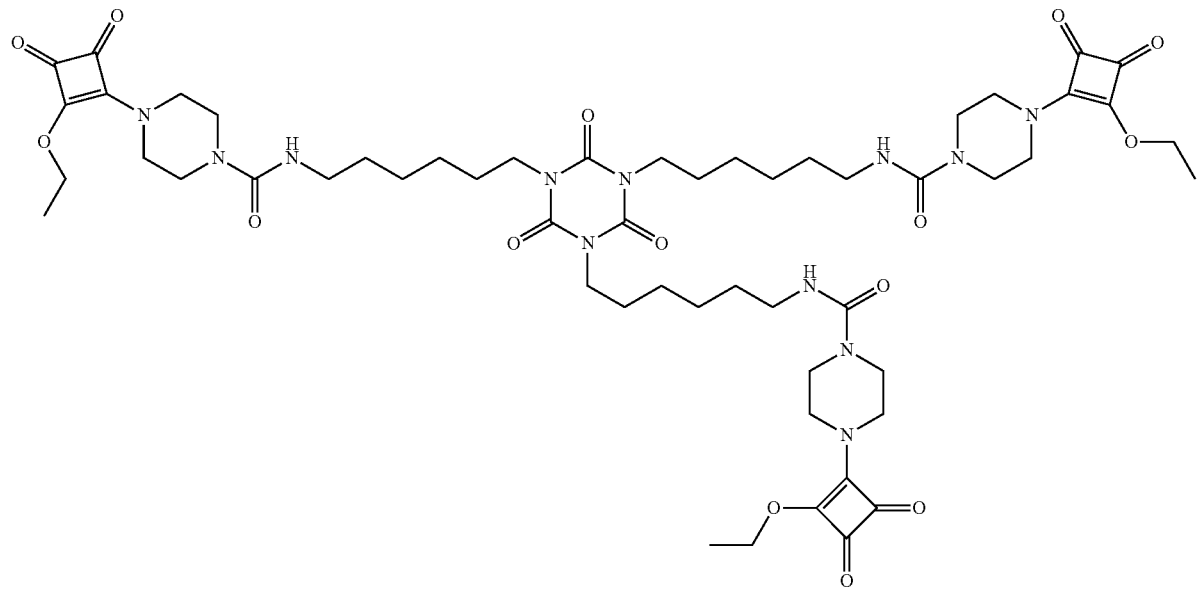

and a nucleophile in the presence of a catalyst.

In another aspect, the present invention is directed to a curable composition comprising the reaction product of [4-[[(2-ethoxy-3,4-dioxo-cyclobuten-1-yl)amino]methyl] phenyl] N-[6-[3,5-bis[6-[[4-[[(2-ethoxy-3,4-dioxo-cyclobuten-1 yl)amino]methyl]phenoxy]carbonylamino] hexyl]-2,4,6-trioxo-1,3,5-triazinan-1-yl]hexyl]carbamate (Formula III),

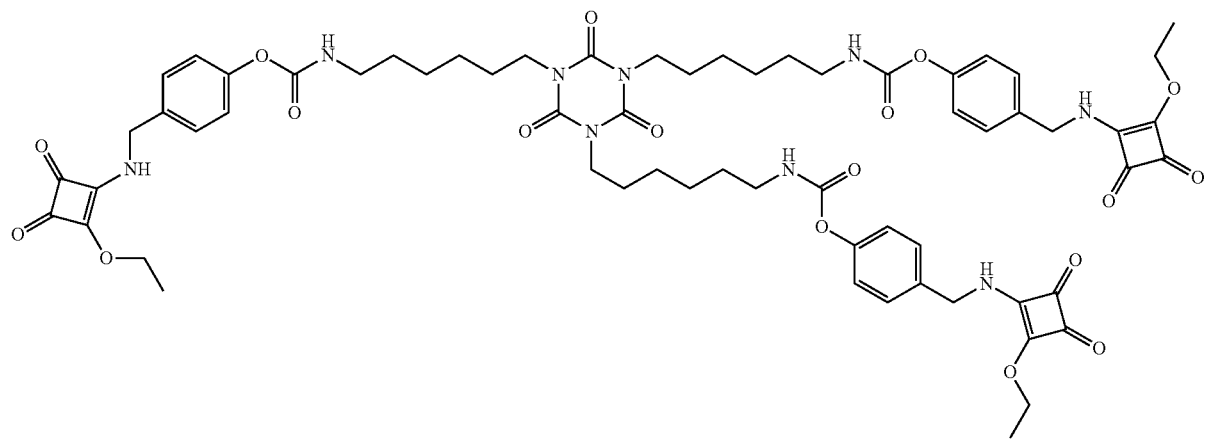

and a nucleophile in the presence of a catalyst.

In a further aspect, the present invention is directed to a curable composition comprising the reaction product of 4-[2-[(2-oxo-2-phenyl-acetyl)amino]ethyl]-N-[6-[2,4,6-trioxo-3,5-bis[6-[[4-[2-[(2-oxo-2-phenyl-acetyl)amino]ethyl]piperazine-1-carbonyl]amino]hexyl]-1,3,5-triazinan-1-yl]hexyl]piperazine-1-carboxamide (Formula IV),

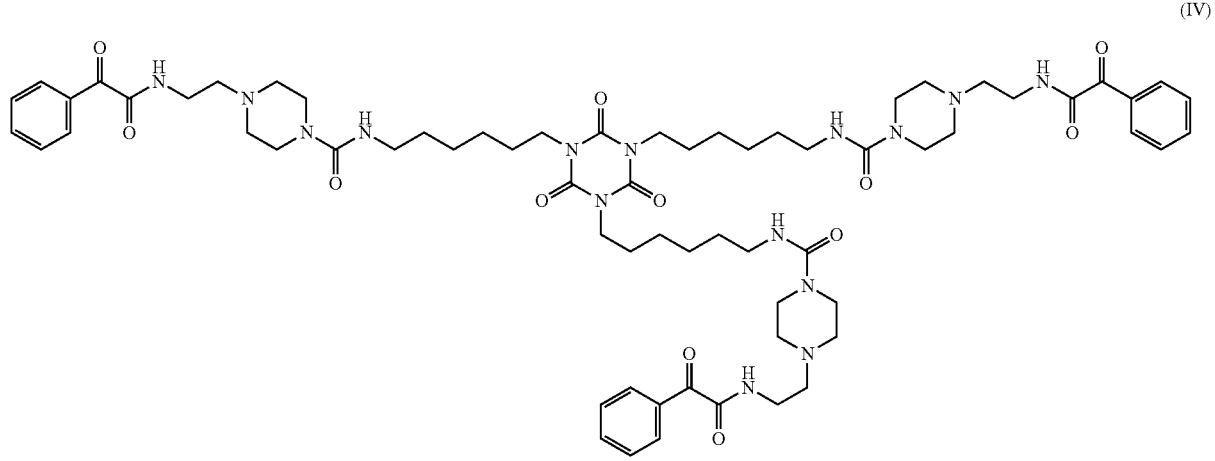 [SMILES: O=C(NCCN1CCN(C(=O)NCCCCCCn2c(=O)n(CCCCCCNC(=O)N3CCN(CCNC(=O)C(=O)c4ccccc4)CC3)c(=O)n(CCCCCCNC(=O)N3CCN(CCNC(=O)C(=O)c4ccccc4)CC3)c2=O)CC1)C(=O)c1ccccc1]

and a nucleophile in the presence of a catalyst.

In a still further aspect, the present invention is directed to a curable composition comprising the reaction product of [4-[[(2-oxo-2-phenyl-acetyl)amino]methyl]phenyl] N-[6-[2,4,6-trioxo-3,5-bis[6-[[4-[[(2-oxo-2-phenyl-acetyl)amino]methyl]phenoxy]carbonylamino]hexyl]-1,3,5-triazinan-1-yl]hexyl]carbamate, (Formula V),

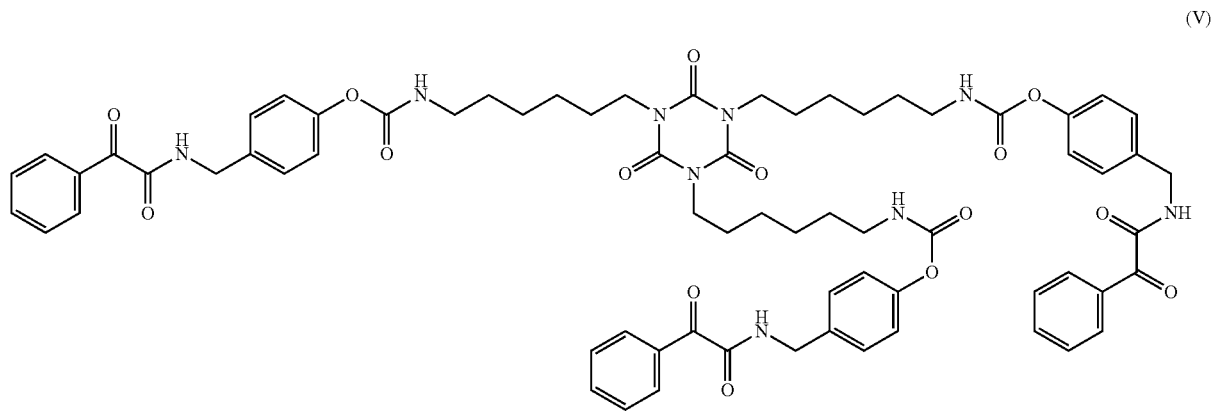 [SMILES: O=C(NCCCCCCn1c(=O)n(CCCCCCNC(=O)Oc2ccc(CNC(=O)C(=O)c3ccccc3)cc2)c(=O)n(CCCCCCNC(=O)Oc2ccc(CNC(=O)C(=O)c3ccccc3)cc2)c1=O)Oc1ccc(CNC(=O)C(=O)c2ccccc2)cc1]

and a nucleophile in the presence of a catalyst.

In yet another aspect, the present invention is directed to a curable composition comprising the reaction product of 2-oxo-2-phenyl-N-[[4-[6-[2,4,6-trioxo-3,5-bis[6-[[4-[[(2-oxo-2-phenyl-acetyl)amino]methyl]phenyl]carbamoylamino]hexyl]-1,3,5-triazinan-1-yl]hexylcarbamoylamino]phenyl]methyl]acetamide (Formula VI),

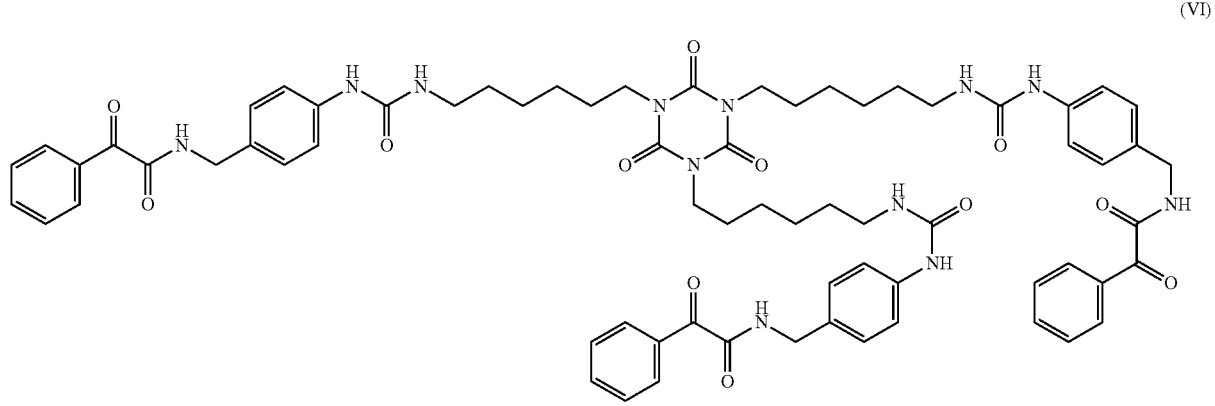 [SMILES: O=C(NCCCCCCn1c(=O)n(CCCCCCNC(=O)Nc2ccc(CNC(=O)C(=O)c3ccccc3)cc2)c(=O)n(CCCCCCNC(=O)Nc2ccc(CNC(=O)C(=O)c3ccccc3)cc2)c1=O)Nc1ccc(CNC(=O)C(=O)c2ccccc2)cc1]

and a nucleophile in the presence of a catalyst.

In still another aspect, the present invention is directed to a curable composition comprising the reaction product of 2-[(2-oxo-2-phenyl-acetyl)amino]ethyl N-[6-[2,4,6-trioxo-3,5-bis[6-[2-[(2-oxo-2-phenyl-acetyl)amino]ethoxycarbonyl amino]hexyl]-1,3,5-triazinan-1-yl]hexyl]carbamate (Formula VII),

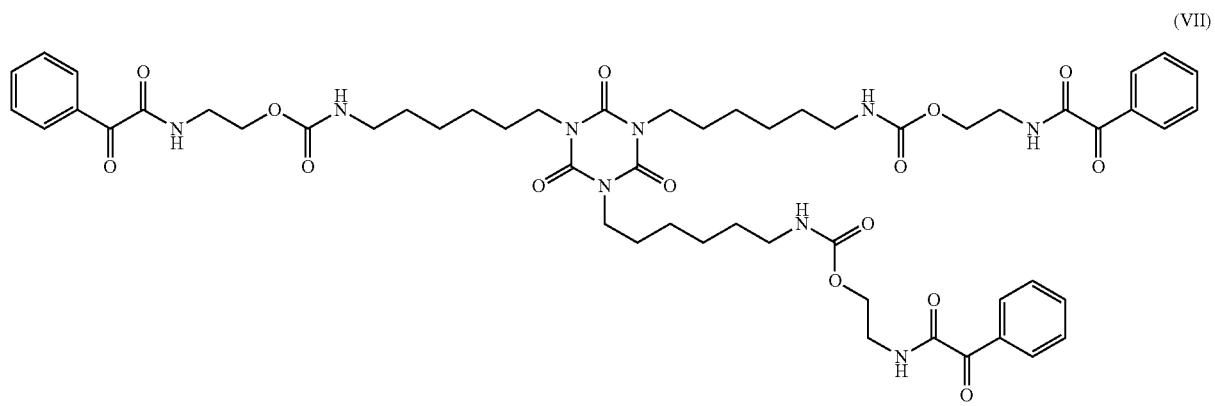 [SMILES: O=C(NCCCCCCn1c(=O)n(CCCCCCNC(=O)OCCNC(=O)C(=O)c2ccccc2)c(=O)n(CCCCCCNC(=O)OCCNC(=O)C(=O)c2ccccc2)c1=O)OCCNC(=O)C(=O)c1ccccc1]

and a nucleophile in the presence of a catalyst.

In still yet another aspect, the present invention is directed to a curable composition comprising the reaction product of 2,5-dioxopyrrolidin-1-yl) N-[6-[3,5-bis[6-[(2,5-dioxopyrrolidin-1-yl)oxycarbonylamino]hexyl]-2,4,6-trioxo-1,3,5-triazinan-1-yl]hexyl]carbamate (Formula VIII),

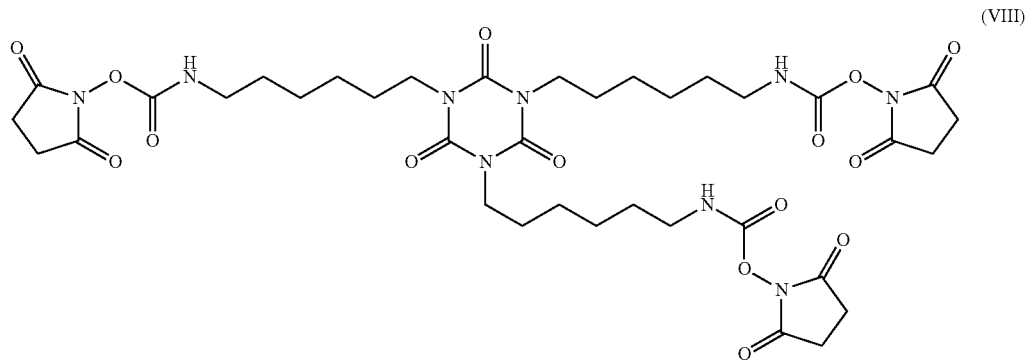 [SMILES: O=C(NCCCCCCn1c(=O)n(CCCCCCNC(=O)ON2C(=O)CCC2=O)c(=O)n(CCCCCCNC(=O)ON2C(=O)CCC2=O)c1=O)ON1C(=O)CCC1=O]

and a nucleophile in the presence of a catalyst.

In an additional aspect, the present invention is directed to a curable composition comprising the reaction product of (4-formyl-2-methoxy-phenyl) N-[6-[3,5-bis[6-[(4-formyl-2-methoxy-phenoxy)carbonylamino]hexyl]-2,4,6-trioxo-1,3,5-triazinan-1-yl]hexyl]carbamate (Formula IX),

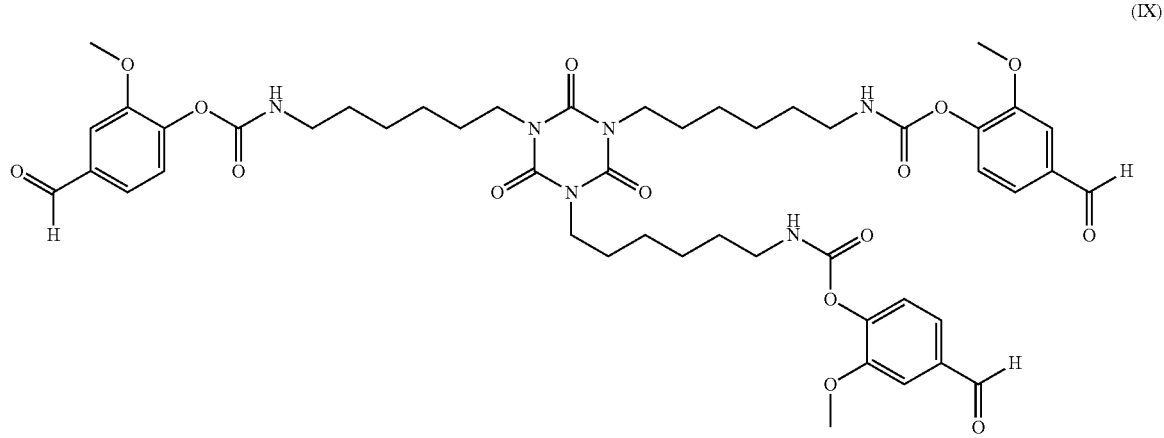

and a nucleophile in the presence of a catalyst.

In the various embodiments of the invention, an aliphatic diisocyanate is reacted with a compound having electrophilic, isocyanate-reactive functional groups. Examples of such compounds include, but are not limited to, oxazolidinones, benzoic sulfimides (saccharins), 1H-indole-2,3-diones (isatins), succinamides, N-hydroxysuccinamides, 4-hydroxy-3-methoxybenzaldehydes (vanillins), α-ketoamides, piperazines, benzofuranones, 3,4-dihydroxycyclobut-3-ene-1,2-diones (squaric acids), squaric acid esters, α-ketoamides, anilines, and α-ketoamide, phenols.

Without wishing to be bound to any particular theory, the present inventors believe that the electrophilic groups crosslink or polymerize with an alcohol-containing, or an amine-containing (wherein "amine" refers to an allophanate, an aromatic or a polyaspartate), or a thiol-containing species, to create a crosslinked polyester, polyurethane, polycarbonate, polyurea or polyether network.

The following are non-exhaustive examples of electrophilic group-containing molecules useful in the context of the present invention:

Molecule E-1—Oxazolidinones

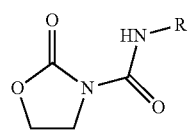

A major use of oxazolidinones is as an antimicrobial, but these compounds are also useful for chiral (asymmetric) synthesis. See e.g., U.S. Pat. Nos. 4,970,217; 5,232,931; 5,698,574; 8,217,029.

Molecule E-2—Saccharins

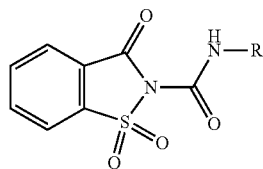
(E-2)

Saccharin (1,1-dioxo-1,2-benzothiazol-3-one) is predominantly used as an artificial sweetener, but may be used to prepare exclusively di-substituted amines from alkyl halides via a nucleophilic substitution, followed by Gabriel synthesis.

Molecule E-3—Isatins

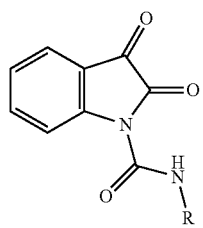
(E-3)

Isatin (1H-indole-2,3-dione) is used for the synthesis of a wide variety of heterocyclic compounds, such as indoles and quinolones.

Molecule E-4—Succinamides

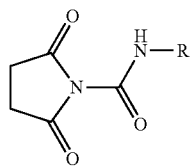
(E-4)

Succinamide (pyrrolidine-2,5-dione) is used as an anti-convulsant drug.

Molecule E-5—N-Hydroxysuccinamides

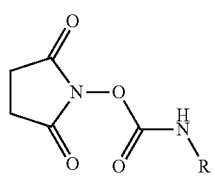
(E-5)

N-hydroxysuccinamide (1-hydroxy-2,5-pyrrolidinedione) is used as an activating reagent for carboxylic acids.

Molecule E-6—Vanillins

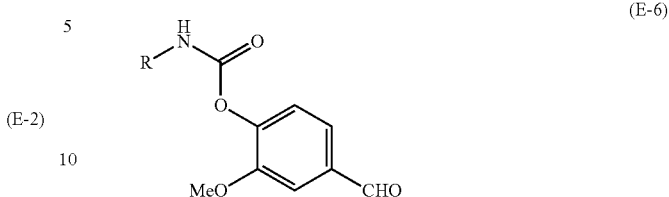
(E-6)

Vanillin (4-hydroxy-3-methoxybenzaldehyde) is used as a flavoring agent and in perfumes. It is also used as a chemical intermediate in the production of pharmaceuticals, cosmetics, and other chemicals.

Molecule E-7—Benzofuranones

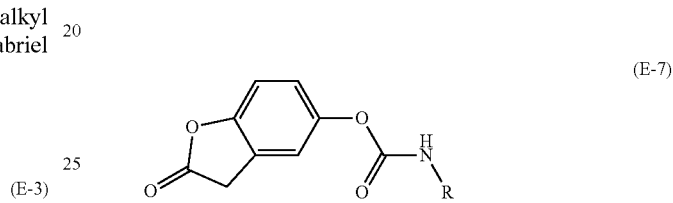
(E-7)

Benzofuranone (1-benzofuran-2(3H)-one) is used in the production of pharmaceutical, agrochemical, and dyestuff intermediates.

Molecules E-8 AND E-9—Squarates

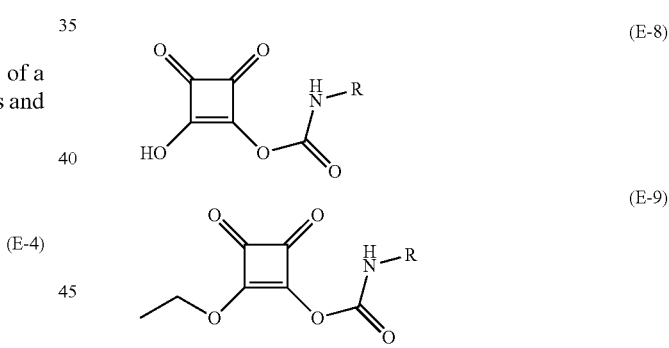
(E-8)

(E-9)

Squarates are useful as reagents for chemical synthesis, and receptor antagonists for chronic obstructive pulmonary disease. Squaric acid (3,4-dihydroxycyclobut-3-ene-1,2-dione) (molecule E-8) and squaric acid ester (molecule E-9). See, e.g., WO 2010/063802.

Molecules E-10, E-11 and E-12-α-ketoamides

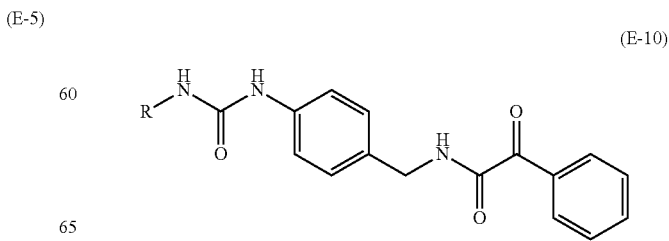
(E-10)

α-ketoamide, aniline (E-10)

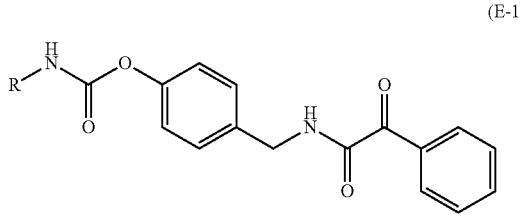

α-ketoamide, phenol (E-11)

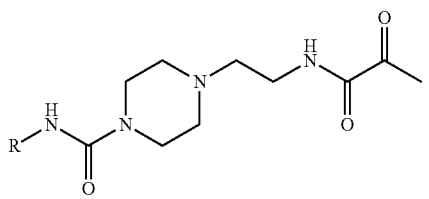

α-ketoamide, piperazine (E-12).

As is known in the art, α-ketoamides are useful in medicinal chemistry, see e.g., U.S. Pat. Nos. 6,143,931; 6,452,050; and 7,749,999.

In the processes of producing the inventive compositions, reactive intermediates are prepared from the electrophilic group containing molecules and an aliphatic diisocyanate. Useful diisocyanate include, but are not limited to those having 4 to 30 carbon atoms, such as for example, tetramethylene diisocyanate, 1,5-pentamethylene diisocyanate, 1,6-hexamethylene diisocyanate (HDI), 2,2,4-(or 2,4,4-) trimethyl-1,6-hexamethylene diisocyanate, pentamethylene diisocyanate (PDI), isophorone diisocyanate (IPDI), lysine diisocyanate, hydrogenated xylene diisocyanate, hydrogenated diphenylmethane diisocyanate, 1,4-diisocyanatocyclohexane, 1,3-bis(diisocyanatomethyl)cyclohexane, and 4,4'-dicyclohexylmethane diisocyanate. In various embodiments, the diisocyanate can comprise at least one of an isocyanurate group, a biuret group, an iminooxadiazine dione group, a urethane group, a uretdione group, a carbodiimide group, and an allophanate group.

In certain embodiments, the present invention is directed to the use of a trimerized isocyanate-based derivative for crosslinking isocyanate-reactive functional groups, such as the isocyanurate shown in Formula (I), which is based on 1,6-hexamethylene diisocyanate (HDI).

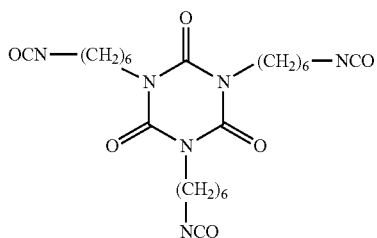

The compositions of the present invention are reacted with a nucleophile in the presence of a catalyst to produce the curable compositions (i.e., coatings, adhesives, sealants, castings, composites and films) of the present invention. Suitable nucleophiles include, but are not limited to amines, in particular aspartic ester functional amines, and polyols, in particular, acrylic polyols.

Aspartic ester functional amines useful in the coating, adhesive, sealant, casting, composite and film compositions of the present invention are described in U.S. Pat. Nos. 5,126,170; 5,236,741; and 5,489,704, all incorporated herein by reference. These polyaspartates comprise compounds of formula (A):

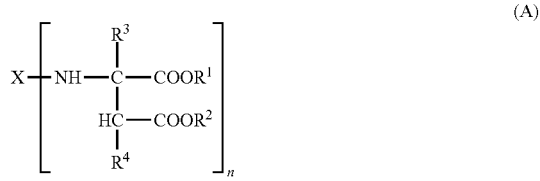

In compounds of formula (A), the residue X is preferably obtained from an n-valent polyamine selected from ethylenediamine, 1,2-diaminopropane, 1,4-diaminobutane, 1,6-diaminohexane, 2,5-diamino-2,5-dimethylhexane, 2,2,4- and/or 2,4,4-trimethyl-1,6-diaminohexane, 1,11-diaminoundecane, 1,12-diaminododecane, 1-amino-3,3,5-trimethyl-5-aminomethylcyclohexane, 2,4- and/or 2,6-hexahydrotoluylenediamine, 2,4'- and/or 4,4'-diaminodicyclohexylmethane, 3,3'-dimethyl-4,4'-diaminodicyclohexylmethane, 2,4,4'-triamino-5-methyldicyclohexylmethane and polyether polyamines with aliphatically bound primary amino groups and having a number average molecular weight $M_n$ of 148 to 6000 g/mol.

The residue X is more preferably obtained from 1,4-diaminobutane, 1,6-diaminohexane, 2,2,4- and/or 2,4,4-trimethyl-1,6-diaminohexane, 1-amino-3,3,5-trimethyl-5-aminomethylcyclohexane, 4,4'-diaminodicyclohexylmethane or 3,3'-dimethyl-4,4'-diaminodicyclo-hexylmethane.

$R^1$ and $R^2$, independently of one another, are in some embodiments $C_1$ to $C_{10}$ alkyl residues, in certain embodiments methyl or ethyl residues. Where X is the residue obtained from 2,4,4'-triamino-5-methyldicyclohexylmethane, $R^1$ and $R^2$ are preferably ethyl. $R^3$ and $R^4$ may be identical or different and represent hydrogen or organic groups which are inert towards isocyanate groups at a temperature of 100° C. or less, preferably hydrogen or $C_1$ to $C_{10}$ alkyl residues, more preferably hydrogen, methyl or ethyl residues. Most preferably, $R^3$ and $R^4$ are both hydrogen. In formula (A), n is preferably an integer from 2 to 6, more preferably 2 to 4. The phrase "inert to isocyanate groups under the reaction conditions," which is used to define groups $R^1$ and $R^2$, means that these groups do not have Zerevitinov-active hydrogens (CH-acid compounds; cf. Römpp Chemie Lexikon, Georg Thieme Verlag Stuttgart), such as OH, NH or SH.

The production of aspartic ester functional amines takes place in known manner by reacting the corresponding primary polyamines of the formula (B):

with maleic or fumaric acid esters of the formula (C):

where $R^1$, $R^2$, $R^3$ and $R^4$ are as defined above for formula (A).

Suitable polyamines are the above-mentioned diamines or triamines (Examples include JEFFAMINE T-403 and NTA). Examples of suitable maleic or fumaric acid esters are dimethyl maleate, diethyl maleate, dibutyl maleate and the corresponding fumarates.

In various embodiments, the production of aspartic ester functional amines from the above-mentioned starting materials takes place within the temperature range of 0° C. to 100° C. The starting materials are used in amounts such that there is at least one, preferably one, olefinic double bond for each primary amino group. Any starting materials used in excess can be separated off by distillation following the reaction. The reaction can take place in the presence or absence of suitable solvents, such as methanol, ethanol, propanol, dioxane or mixtures thereof.

Suitable aspartic ester functional amines for use in producing the coating, adhesive, sealant, casting, composite and film compositions of the present invention include those described in U.S. Pat. Nos. 5,126,170; 5,236,741; 5,489,704; 5,243,012; 5,736,604; 6,458,293; 6,833,424; 7,169,876; and in U.S. Patent Publication No. 2006/0247371, which are incorporated by reference into this specification. In addition, suitable aspartic ester functional amines are commercially available from Covestro LLC, Pittsburgh, Pa., USA, under the names DESMOPHEN NH 1220, DESMOPHEN NH 1420, DESMOPHEN NH 1520, DESMOPHEN NH 1521, DESMOPHEN NH 2850 XP.

Acrylic polyols suitable for producing the coating, adhesive, sealant, casting, composite and film compositions of the present invention include hydroxyl-containing copolymers of olefinically unsaturated compounds, such as those polymers that have a number average molecular weight ($M_n$) determined by vapor pressure or membrane osmometry of 800 to 50,000, such as 1000 to 20,000, or, in some cases, 5000 to 10,000, and/or having a hydroxyl group content of 0.1 to 12% by weight, such as 1 to 10% by weight and, in some cases, 2 to 6% by weight and/or having an acid value of at least 0.1 mg KOH/g, such as at least 0.5 mg KOH/g and/or up to 10 mg KOH/g or, in some cases, up to 5 mg KOH/g. Often, the copolymers are based on olefinic monomers containing hydroxyl groups and olefinic monomers which are free from hydroxyl groups.

Examples of suitable olefinic monomers that are free of hydroxyl groups include vinyl and vinylidene monomers, such as styrene, α-methyl styrene, o- and p-chloro styrene, o-, m- and p-methyl styrene, p-tert-butyl styrene; acrylic acid; methacrylic acid; (meth)acrylonitrile; acrylic and methacrylic acid esters of alcohols containing 1 to 8 carbon atoms, such as ethyl acrylate, methyl acrylate, n- and isopropyl acrylate, n-butyl acrylate, 2-ethylhexyl acrylate, 2-ethylhexyl methacrylate, iso-octyl acrylate, methyl methacrylate, ethyl methacrylate, butyl methacrylate and iso-octyl methacrylate; diesters of fumaric acid, itaconic acid or maleic acid having 4 to 8 carbon atoms in the alcohol component; (meth)acrylic acid amide; and vinyl esters of alkane monocarboxylic acids having 2 to 5 carbon atoms, such as vinyl acetate or vinyl propionate.

Examples of suitable olefinic monomers containing hydroxyl groups are hydroxyalkyl esters of acrylic acid or methacrylic acid having 2 to 4 carbon atoms in the hydroxyalkyl group, such as 2-hydroxyethyl(meth)acrylate, 2-hydroxypropyl(meth)acrylate, 4-hydroxybutyl(meth)acrylate and trimethylolpropane-mono- or pentaerythritomono-(meth)acrylate. Mixtures of the monomers exemplified above may also be used for the preparation of the acrylic polyol. As will be appreciated, (meth)acrylate and (meth) acrylic is meant to encompass methacrylate and acrylate or methacrylic and acrylics, as the case may be. Mixtures of the various polymeric polyols described above may be used.

In certain embodiments, the compositions produced in the present invention are reacted with a nucleophile in the presence of a catalyst to produce the curable compositions (i.e., coatings, adhesives, sealants, castings, composites, and films) of the present invention. Suitable catalysts include, but are not limited to, metallic and nonmetallic catalysts, specific examples of which are amine catalysts, such as 1,8-diazabicyclo[5.4.0]undec-7-ene (DBU), 1,4-diazabicyclo[2.2.2]octane (DABCO) or triethanolamine, and Lewis acid compounds, such as dibutyltin dilaurate, lead octoate, tin octoate, titanium and zirconium complexes, cadmium compounds, bismuth compounds, such as bismuth neodecanoate, zinc compounds, such as zinc neodecanoate, and iron compounds.

In various embodiments, the curable compositions of the present invention may further include any of a variety of additives such as defoamers, devolatilizers, surfactants, thickeners, flow control additives, colorants (including pigments and dyes) or surface additives. In selected embodiments, the curable compositions of the present invention may be admixed and combined with the conventional paint-technology binders, auxiliaries and additives, selected from the group of pigments, dyes, matting agents, flow control additives, wetting additives, slip additives, pigments, including metallic effect pigments, fillers, nanoparticles, light stabilizing particles, anti-yellowing additives, thickeners, and additives for reducing the surface tension.

The curable compositions of the invention may be contacted with a substrate by any methods known to those skilled in the art, including but not limited to, spraying, dipping, flow coating, rolling, brushing, pouring, and the like. In some embodiments, the inventive curable compositions may be applied in the form of paints or lacquers onto any compatible substrate, such as, for example, metals, plastics, ceramics, glass, and natural materials. In certain embodiments, the curable composition is applied as a single layer. In other embodiments, the inventive curable compositions may be applied as multiple layers as needed.

EXAMPLES

The non-limiting and non-exhaustive examples that follow are intended to further describe various non-limiting and non-exhaustive embodiments without restricting the scope of the embodiments described in this specification. All quantities given in "parts" and "percents" are understood to be by weight, unless otherwise indicated. Although the present invention is described in the instant Examples in the context of a coating made from an isocyanurate, those skilled in the art will appreciate it can also be equally applicable to adhesives, castings, composites, films, and sealants made from any of isocyanurates, biurets, iminooxadiazine diones, urethanes, uretdiones, carbodiimides, and allophanates. The present disclosure is intended to encompass all such compounds.

The following materials were used to produce the compositions of the Examples.

ISOCYANATE A isocyanurate group-containing polyisocyanate trimer prepared from 1,6-hexamethylene diisocyanate and having an isocyanate content of 21.6%, a content of monomeric diisocyanate of <0.2% and a viscosity of 3000 mPa·s at 20° C., commercially available from Covestro as DESMODUR N 3300;

ADDITIVE A surface additive on polyacrylate, commercially available from BYK Chemie as BYK 358;

CATALYST A dibutyltin dilaurate, commercially available from Air Products as DABCO T-12;

CATALYST B a 40% solution of p-toluenesulfonic acid in isopropanol available from Allnex as CYCAT 4040;

CATALYST C 1,4-diazabicyclo[2.2.2]octane (DABCO), commercially available from Evonik;

CATALYST D zinc neodecanoate, commercially available from Borchers as ZN TEN CEM;

NUCLEOPHILE A a 100% solids content aspartic ester functional amine, having an amine number of approx. 201 mgKOH/g, viscosity @ 25° C. of 1450 mPa·s}, commercially available from Covestro as DESMOPHEN NH 1420;

NUCLEOPHILE B a hydroxy-functional acrylic polyol commercially available from Nuplex Resins LLC as SETALUX DA870;

NUCLEOPHILE C a polyoxypropylene triamine commercially available from Huntsmann as JEFFAMINE T-403;

SOLVENT A ethyl acetate;

SOLVENT B acetonitrile;

SOLVENT C methyl ethyl ketone; and

SOLVENT D acetone.

Reaction Procedure:

A 250 mL, three-neck round bottom flask fitted with a stir bar, Graham condenser with an oil bubbler outlet, $N_2$ gas inlet, and a constant pressure addition funnel was charged with 1 equivalent of reactive intermediate (1 mol/mol of NCO), 70 mL of SOLVENT (generally, EtOAc, $CH_3CN$, MEK, acetone or other appropriate solvent) and the reaction vessel was placed in an oil bath and heated to 60° C. with stirring.

The reaction mixture was treated with 100 μl of 10% CATALYST A in SOLVENT C (or with a sufficient amount to provide 0.1% catalyst on dry solids).

The addition funnel was charged with a pre-made solution of ISOCYANATE A (3.085 mL, 1 NCO mol/mol of reactive intermediate) in the appropriate solvent (30 mL).

After 20 minutes at 60° C., the reaction mixture was treated dropwise with the ISOCYANATE A solution over a 45-60 minute period.

After the addition was complete, a drop of crude reaction mixture was dried on a piece of aluminum foil and analyzed by FTIR to monitor disappearance of the characteristic NCO stretch at 2270 $cm^{-1}$. The in process FTIR analysis was repeated until the complete loss of the characteristic NCO stretch at 2270 $cm^{-1}$, which generally took one to three days.

After all of the ISOCYANATE A was consumed, the reaction was allowed to cool to room temperature and was filtered by gravity filtration and transferred to a 250 mL one-neck round bottom flask and concentrated under reduced pressure.

In the specific case of the squarate piperazine substrate, which was delivered as the hydrochloride—a slight excess of organic base was used to neutralize the HCl salt. At the end of the reaction, the reaction mix was washed 1× with 0.1N HCl+1× with deionized water (to remove the organic base) and 1× with saturated NaCl solution (to extract excess water). The organic phase was retained and dried.

The resulting residue, generally 95-110% mass recovery, was used in the crosslinking and film preparation examples without further purification.

Formulation and Coating:

Ratios for the electrophiles and nucleophiles (NUCLEOPHILE A, NUCLEOPHILE B and NUCLEOPHILE C) were determined by their theoretical and experimentally determined reactive group and hydroxyl/amine number, respectively. Ratios were chosen to enable ideal 1:1 reactivity with these groups. Catalysts were varied but included CATALYST A, CATALYST B, CATALYST C, or no catalyst at all.

Mixing of small batches for initial testing was performed using a SPEEDMIXER (FLACKTEK—Model DAC 400 MVZ) and 5 mL screw top SPEEDMIXER cups. Samples were mixed in two stages. In the first stage, the material was dispersed in an appropriate evaluation solvent (typically MEK) and mixed at 2000 RPM for 5 minutes. In the second step, the nucleophile of choice was added to that dispersion and mixed again at 2000 RPM for an additional 5 minutes.

If the resulting dispersion was fluid enough to be coated, a bead of the formulation was applied to the top of a phosphate coated steel panel (ACT Test Panels—4"×6"×0.032"—B1000 P60) using a Paul N. Gardner (GARDCO), Multiple Clearance Square Applicator using the 3 mil (wet thickness) applicator for a target 50 μm dry thickness based on percent solids.

Coating samples were dried at room temperature and at 60° C. (Thermo Scientific—HERATHERM OMH 60-S) overnight to compare the performance at different curing conditions.

Crosshatch tape peel (ASTM D3359) was measured (pass/fail) with 610 cellophane tape across a razor scored grid on the coating.

Pendulum hardness (ASTM D4366), the number of oscillations for a 5-3° dampening response, was measured using B YK-GARDNER 3° König Pendulum Hardness test device. Three points were measured on each coated sample.

Solvent resistance (ASTM 4752) was first semi-quantitatively measured using felt rubs by hand. Promising samples were then measured on a TABER 5750 LINEAR ABRASER using a cheesecloth-wrapped probe surface (cylindrical end) and a total weight of 850 g. Double rubs to abrasion and failure to substrate were recorded.

Piperazine Squarates

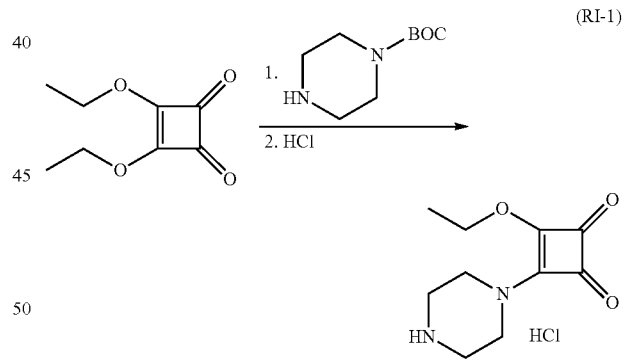

Reactive intermediate (3-ethoxy-4-piperazin-1-yl-cyclobut-3-ene-1,2-dione hydrochloride salt) (Formula RI-1) was prepared as follows:

A 250 mL round bottom flask was charged with 3,4-diethoxycyclobut-3-ene-1,2-dione (10 g, 0.0588 mol), ethanol (200 proof, 100 mL, 0.6 M), a stir bar and stirred at room temperature. The reaction mixture was treated with tert-butyl piperazine-1-carboxylate (1.0 equivalent, 10.9 g, 0.0588 mol) and the reaction was stirred at room temperature. After five days, the reaction was filtered and the collected white solid was washed 2×10 mL ethanol. The collected solid was dried under reduced pressure to provide 9.85 g of white powder confirmed by liquid chromatography mass spectrometry (LCMS).

A 250 mL round bottom flask was charged with the tert-butyloxycarbonyl (t-BOC)-protected intermediate (9.85 g, 0.0318 mol), methylene chloride (5 mL) and stirred at room temperature. The reaction mixture was treated with 2 M HCl in ether (2.5 equivalents 0.0795 mol, 40 mL) and the reaction was stirred at room temperature for 3 hours. After three hours, 10 mL of ether was added and the reaction was filtered by vacuum filtration. The collected white solid was washed 2×15 mL ether and then dried under reduced pressure to provide 3-ethoxy-4-piperazin-1-yl-cyclobut-3-ene-1,2-dione hydrochloride salt, (5.5 g, 12.4 g theoretical, 44.4%) as a white powder. $^1$H NMR (DMSO-d6) δ 9.70 (s, 1H), 4.64 (q, 2H), 3.98 (m, 2H), 3.74 (m, 2H), 3.21 (m, 4H), 1.36 (t, 3H); LCMS: 211.1 (M+H).

Reactive Intermediate (Formula RI-1) was reacted with ISOCYANATE A according to the Reaction Procedure described herein with the addition of 2.1 equivalents of diisopropylethylamine to scavenge HCl. N-[6-[3,5-bis[6-[[4-(2-ethoxy-3,4-dioxo-cyclobuten-1-yl)piperazine-1-carbonyl]amino]hexyl]-2,4,6-trioxo-1,3,5-triazinan-1-yl]hexyl]-4-(2-ethoxy-3,4-dioxo-cyclobuten-1-yl)piperazine-1-carboxamide (Formula II) was produced:

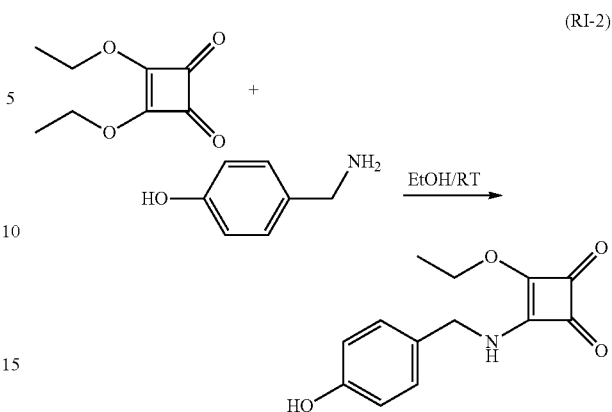

(RI-2)

A 250 mL round bottom flask was charged with the 3,4-diethoxycyclobut-3-ene-1,2-dione (10 g, 0.0588 mol), ethanol (200 proof, 100 mL, 0.6 M), a stir bar and stirred at room temperature. The reaction mixture was treated with

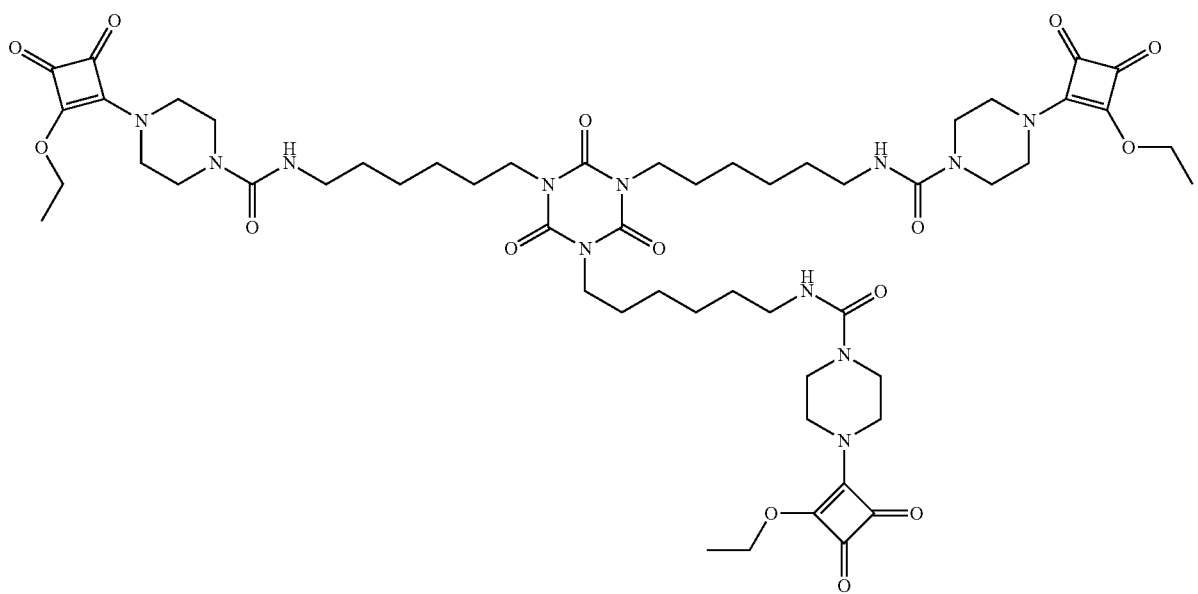

(II)

| Catalyst | Reagent | Stock % | Wt. % | g |
|---|---|---|---|---|
| CATALYST A | NUCLEOPHILE B* | 100 | 58.36 | 1.75 |
| | Formula II | 100 | 41.64 | 1.24 |
| CATALYST B | NUCLEOPHILE B** | 100 | 58.36 | 1.75 |
| | Formula II | 100 | 41.64 | 1.25 |
| | CATALYST B | 40 | 0.1 | 0.008 |
| No Catalyst | NUCLEOPHILE C | 100 | 27.84 | 0.487 |
| | Formula II | 100 | 72.15 | 1.263 |
| | MEK | 100 | | 0.75 |

NUCLEOPHILE B* is NUCLEOPHILE B in with 0.5% ADDITIVE A and 0.1% CATALYST A in n-butyl acetate (70% solids).
NUCLEOPHILE B** is NUCLEOPHILE B in n-butyl acetate (70% solids).

Amino Squarates

Reactive Intermediate 3-ethoxy-4-[(4-hydroxyphenyl)methyl amino]cyclobut-3-ene-1,2-dione (Formula RI-2) was prepared as follows:

4-hydroxylbenzyl amine (1.0 equivalent, 7.24 g, 0.0588 mol) and the reaction was stirred at room temperature. After two days, the reaction was complete by crude LCMS with a single product peak with the correct mass spectrum and was concentrated under reduced pressure to produce 3-ethoxy-4-[(4-hydroxyphenyl)methylamino]cyclobut-3-ene-1,2-dione (11.55 g, 14.5 g theoretical, 79.5%) as a pale yellow solid. $^1$H NMR (acetone-d6) δ 7.17 (t, 2H), 6.81 (d, 2H), 4.70 (m, 2H), 4.67 (s, 2H), 1.41 (m, 3H); LCMS: 248.1 (M+H).

Reactive Intermediate (Formula RI-2) was reacted with ISOCYANATE A according to the Reaction Procedure described herein to produce [4-[[(2-ethoxy-3,4-dioxo-cyclobuten-1-yl)amino]methyl]phenyl] N-[6-[3,5-bis[6-[[4-[[(2-ethoxy-3,4-dioxo-cyclobuten-1-yl)amino]methyl]phenoxy]carbonylamino]hexyl]-2,4,6-trioxo-1,3,5-triazinan-1-yl]hexyl]carbamate (Formula II), (III)

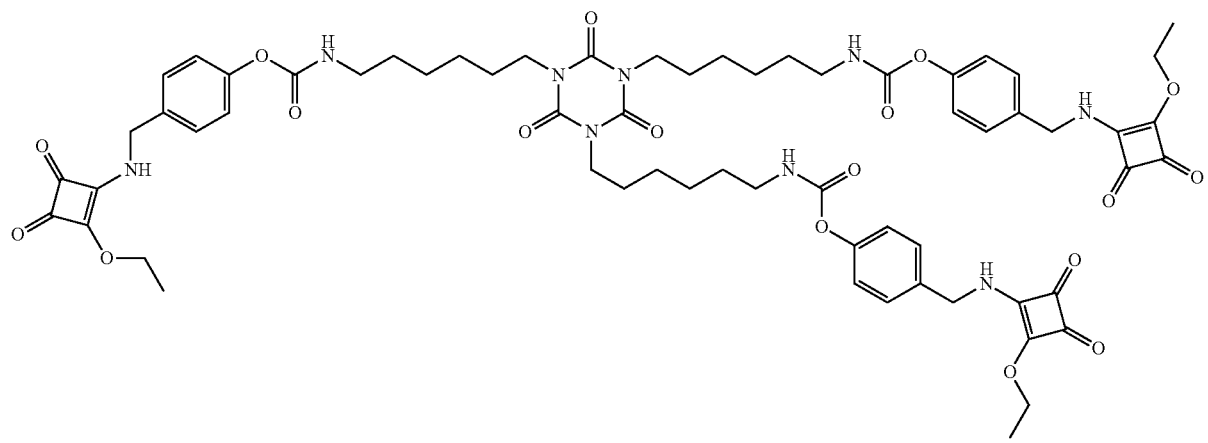

Phenyl α-Ketoamides a) Reactive Intermediate N-[(4-aminophenyl)methyl]-2-oxo-2-phenyl-acetamide (Formula RI-3) was Prepared as Follows (RI-3)

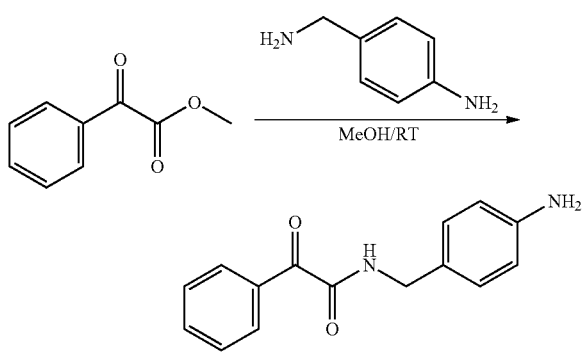

A 100 mL round bottom flask was charged with 4-aminobenzyl amine (5 g, 0.0409 mol), methanol (25 mL, 1.6 M), a stir bar, methyl, 2-oxo-2-phenyl-acetate (1.0 equivalent, 0.0409 mol, 6.72 g) and stirred at room temperature. After 16 hours, the reaction was complete by LCMS analysis with a single peak for the desired product. The solution was transferred to a 250 mL round bottom flask and concentrated under reduced pressure to provide N-[(4-aminophenyl)methyl]-2-oxo-2-phenyl-acetamide, (10.2 g, 10.4 g theoretical, 98.0%) as a pale yellow solid that was used directly in the next step without further purification. 1H NMR (CDCl3) δ 8.32 (t, 2H), 7.48 (d, 1H), 7.46 (m, 2H), 7.10 (dd, 2H), 6.61 (dd, 2H), 4.42 (s, 2H); LCMS: 254.9 (M+H).

Reactive Intermediate (Formula RI-3) was reacted with ISOCYANATE A according to the Reaction Procedure described herein to produce 4-[2-[(2-oxo-2-phenyl-acetyl)amino]ethyl]-N-[6-[2,4,6-trioxo-3,5-bis[6-[[4-[2-[(2-oxo-2-phenyl-acetyl)amino]ethyl]piperazine-1-carbonyl]amino]hexyl]-1,3,5-triazinan-1-yl]hexyl]piperazine-1-carboxamide (Formula IV).

(IV)

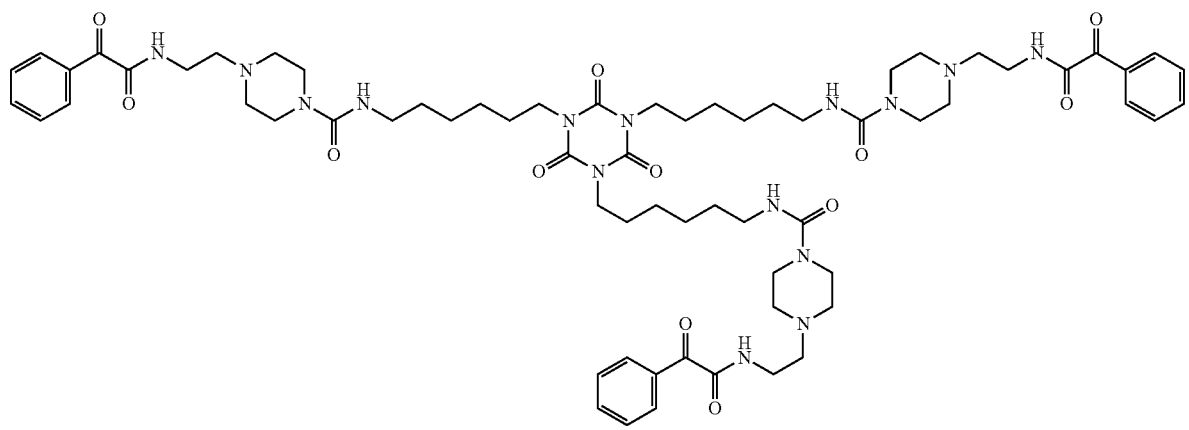

TABLE II

| Catalyst | Reagent | Stock % | Wt. % | g |
|---|---|---|---|---|
| CATALYST B | NUCLEOPHILE C | 100 | 26.2 | 0.655 |
| | Phenyl α-Ketoamide | 100 | 73.8 | 3.690 |
| | CATALYST B | 40 | 0.8 | 0.050 |

NMR (DMSO-d6) δ 9.37 (s, 1H), 7.96 (ddd, 2H), 7.71 (dd, 1H), 7.57 (ddd, 2H), 7.12 (m, 2H), 6.72 (dd, 2H), 4.33 (3, 2H); LCMS: 256.1 (M+H).

Reactive Intermediate (Formula RI-4) was reacted with ISOCYANATE A according to the Reaction Procedure described herein to produce [4-[[(2-oxo-2-phenyl-acetyl)amino]methyl]phenyl] N-[6-[2,4,6-trioxo-3,5-bis[6-[[4-[[(2-oxo-2-phenyl-acetyl)amino]methyl]phenoxy]carbonylamino]hexyl]-1,3,5-triazinan-1-yl]hexyl]carbamate (Formula V).

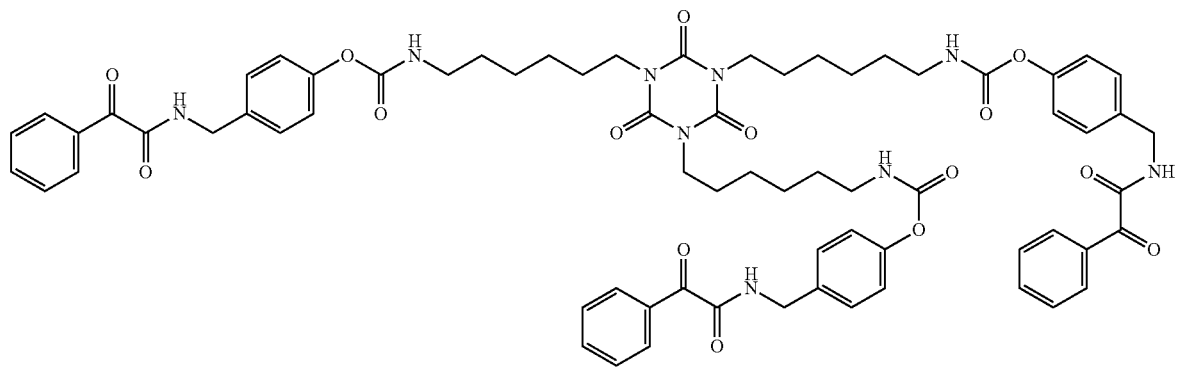

(V)

b) Reactive Intermediate N-[(4-hydroxyphenyl)methyl]-2-oxo-2-phenyl-acetamide (Formula RI-4) was Prepared as Follows c) Reactive Intermediate 2-oxo-2-phenyl-N-(2-piperazin-1-ylethyl)acetamide (Formula RI-5) was Prepared as Follows

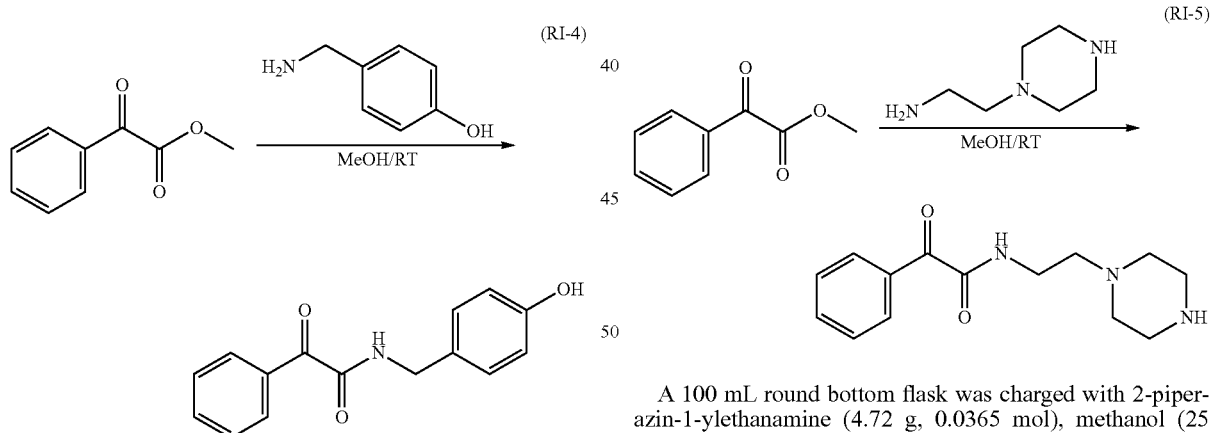

A 250 mL round bottom flask was charged with 4-hydroxybenzyl amine (5 g, 0.0406 mol), methanol (45 mL, 0.9 M), a stir bar, methyl, 2-oxo-2-phenyl-acetate (1.0 equivalent, 0.0406 mol, 6.66 g) and stirred at room temperature. The white slurry immediately became a yellow solution upon the addition of the keto ester. After two days, the reaction was complete by LCMS analysis and was concentrated under reduced pressure to provide N-[(4-hydroxyphenyl)methyl]-2-oxo-2-phenyl-acetamide, (7.90 g, 10.4 g theoretical, 76.2%) as an off-white solid that was used directly in the next step without further purification. $^1$H A 100 mL round bottom flask was charged with 2-piperazin-1-ylethanamine (4.72 g, 0.0365 mol), methanol (25 mL), a stir bar, methyl, 2-oxo-2-phenyl-acetate (1.0 equivalent, 0.0365 mol, 6.0 g) and stirred at room temperature. After four days, the reaction was complete by LCMS analysis. The reaction was concentrated under reduced pressure to provide 2-oxo-2-phenyl-N-(2-piperazin-1-ylethyl)acetamide as an oil, which was washed with 1:1 ether/methanol (25 mL) and the resulting residue was dried under reduced pressure to provide a pale yellow solid (2.88 g, 9.55 g theoretical, 30.2%) that was used directly in the next step without further purification. $^1$H NMR (CDCl$_3$) δ 8.29 (dd, 2H), 7.60 (m, 1H), 7.46 (m, 2H), 3.45 (m, 2H), 2.88 (m, 5H), 2.55 (m, 5H); LCMS: 262.1 (M+H).

Reactive Intermediate (Formula RI-5) was reacted with ISOCYANATE A according to the Reaction Procedure described herein to produce 2-oxo-2-phenyl-N-[[4-[6-[2,4,6-trioxo-3,5-bis[6-[[4-[[(2-oxo-2-phenyl-acetyl)amino]methyl]phenyl]carbamoylamino]hexyl]-1,3,5-triazinan-1-yl]hexylcarbamoylamino]phenyl]methyl]acetamide (Formula VI). The resulting material was not readily soluble.

A 100 mL round bottom flask was charged with 2-aminoethanol (2.23 g, 0.0366 mol), methanol (25 mL, 1.5 M), a stir bar, methyl, 2-oxo-2-phenyl-acetate (1.0 equivalent, 0.0366 mol, 6.0 g) and stirred at room temperature. After three days, the reaction was complete by LCMS analysis.

(VI)

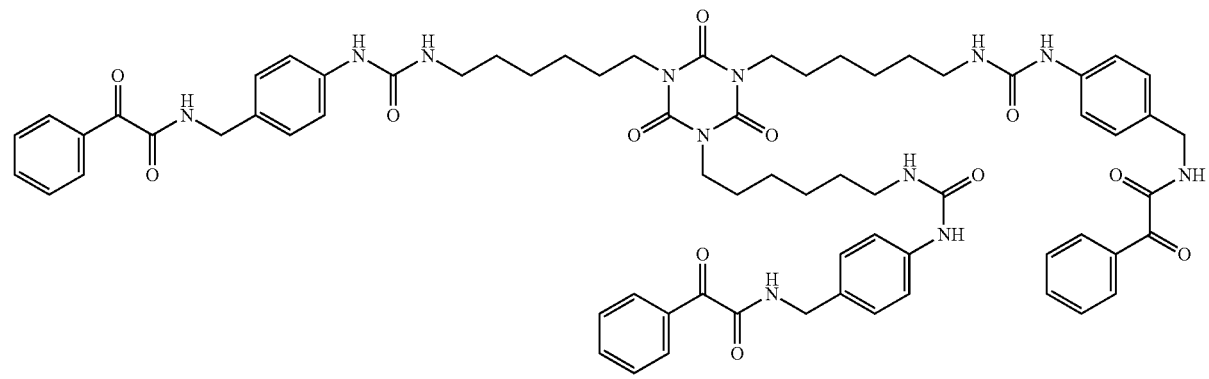

d) Reactive Intermediate N-(2-hydroxyethyl)-2-oxo-2-phenyl-acetamide (Formula RI-6) was Prepared as Follows

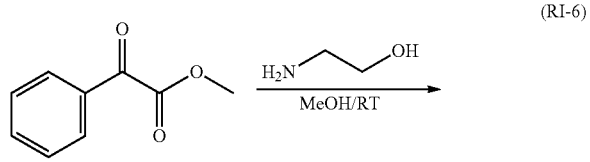

(RI-6)

The reaction mixture was concentrated under reduced pressure to provide N-(2-hydroxyethyl)-2-oxo-2-phenyl-acetamide, (7.0 g, 7.06 g theoretical, 99.1%) as a yellow oil that was used directly in the next step without further purification. $^1$H NMR (CDCl$_3$) δ 8.27 (dd, 2H), 7.60 (m, 1H), 7.43 (m, 2H), 3.79 (t, 2H), 3.53 (t, 2H); LCMS: 194.0 (M+H).

Reactive Intermediate (Formula RI-6) was reacted with ISOCYANATE A according to the Reaction Procedure described herein to produce 2-[(2-oxo-2-phenyl-acetyl)amino]ethyl N-[6-[2,4,6-trioxo-3,5-bis[6-[2-[(2-oxo-2-phenyl-acetyl)amino]ethoxycarbonylamino]hexyl]-1,3,5-triazinan-1-yl]hexyl]carbamate (Formula VII).

(VII)

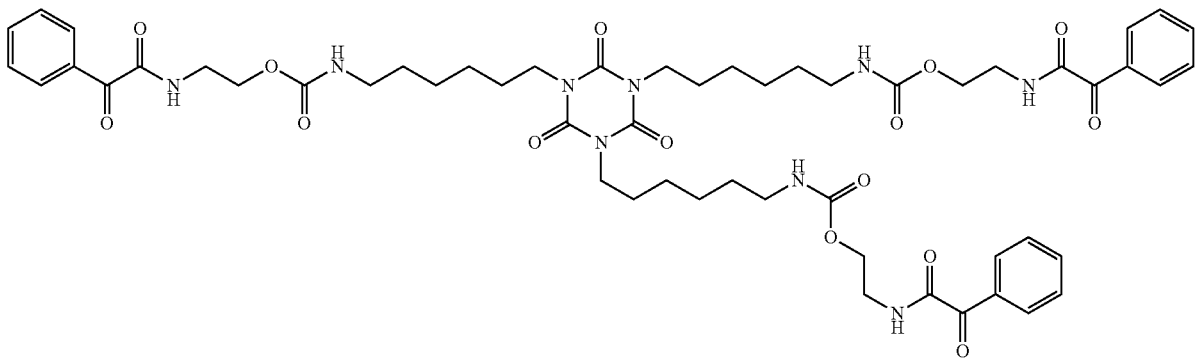

-continued

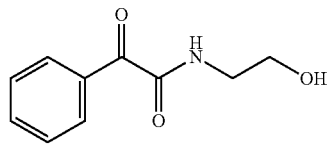

N-Hydroxysuccinamide

N-Hydroxysuccinamide was reacted with ISOCYANATE A according to the Reaction Procedure described herein to produce (2,5-dioxopyrrolidin-1-yl) N-[6-[3,5-bis[6-[(2,5-dioxopyrrolidin-1-yl)oxycarbonylamino]hexyl]-2,4,6-trioxo-1,3,5-triazinan-1-yl]hexyl]carbamate (Formula VIII).

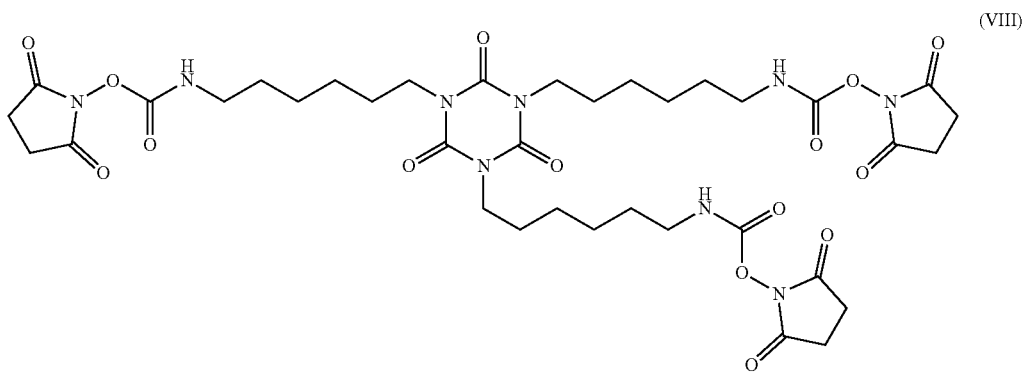 [SMILES: O=C(NCCCCCCn1c(=O)n(CCCCCCNC(=O)ON2C(=O)CCC2=O)c(=O)n(CCCCCCNC(=O)ON2C(=O)CCC2=O)c1=O)ON1C(=O)CCC1=O]

(VIII)

TABLE III

| Catalyst | Reagent | Stock % | Wt. % | Vol. % | (g) |
| --- | --- | --- | --- | --- | --- |
| None | NUCLEOPHILE C | 100 | 23.9 | 34.7 | 1.193 |
|  | NHS | 100 | 46.1 |  | 2.307 |
|  | SOLVENT C | 100 | 30 | 30 | 1.5 |
| CATALYST A | NUCLEOPHILE C | 100 | 23.9 | 34.7 | 1.193 |
|  | NHS | 100 | 46.1 |  | 2.307 |
|  | SOLVENT C | 100 | 30 | 30 | 1.5 |
|  | CATALYST A | 10 | 0.07 |  | .035 |
| CATALYST C | NUCLEOPHILE C | 100 | 23.9 | 34.7 | 1.193 |
|  | NHS | 100 | 46.1 |  | 2.307 |
|  | SOLVENT C | 100 | 30 | 30 | 1.5 |
|  | CATALYST C | 10 | 0.212 |  | 0.106 |
| CATALYST B | NUCLEOPHILE C | 100 | 23.9 | 34.7 | 1.193 |
|  | NHS | 100 | 46.1 |  | 2.307 |
|  | SOLVENT C | 100 | 30 | 30 | 1.5 |
|  | CATALYST B | 40 | 0.0438 |  | 0.0055 |

TABLE IV

| Sample | 1 day Room Temp. cure only | | 1 day Room Temp. cure + 1 day @ 60° C. | |
| --- | --- | --- | --- | --- |
|  | MEK Rubs (Hand) | Tape peel | MEK Rubs (Hand) | Tape peel |
| No Catalyst | 5 | Pass | 50 | Pass |
| CATALYST A | 8 | Pass | 80 | Pass |
| CATALYST C | 7 | Pass | 70 | Pass |
| CATALYST B | 6 | Pass | 80 | Pass |

Vanillin

Vanillin was reacted with ISOCYANATE A according to the Reaction Procedure described herein to produce (4-formyl-2-methoxy-phenyl) N-[6-[3,5-bis[6-[(4-formyl-2-methoxy-phenoxy)carbonylamino]hexyl]-2,4,6-trioxo-1,3,5-triazinan-1-yl]hexyl]carbamate (Formula IX).

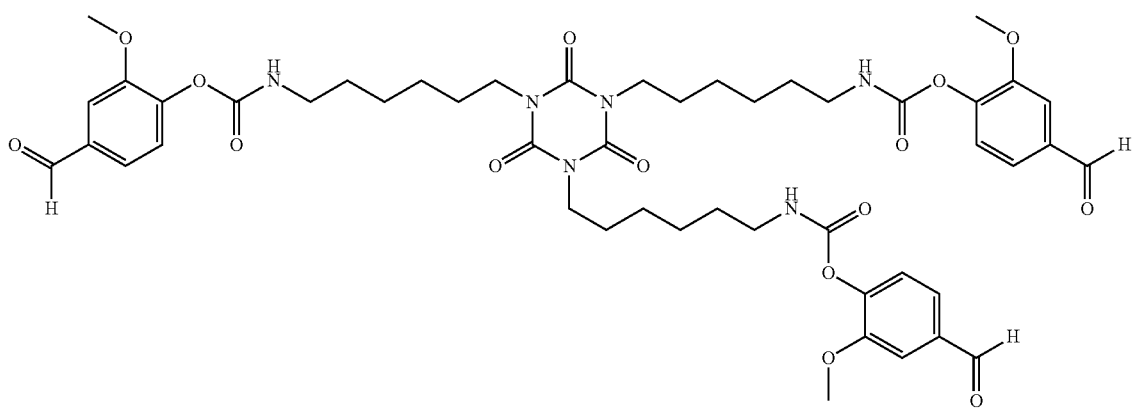

(IX)

TABLE V

| Catalyst | Reagent | Stock % | Wt. % | g |
|---|---|---|---|---|
| CATALYST A | NUCLEOPHILE B* | 100 | 62.62 | 3.131 |
| | Vanillin | 100 | 37.38 | 1.869 |
| CATALYST B | NUCLEOPHILE B** | 100 | 62.62 | 3.131 |
| | Vanillin | 100 | 37.38 | 1.869 |
| | CATALYST B | 40 | 0.1 | 0.013 |
| CATALYST D | NUCLEOPHILE B** | 100 | 62.62 | 1.193 |
| | Vanillin | 100 | 37.38 | 2.307 |
| | CATALYST D | 100 | 0.1 | 0.005 |

NUCLEOPHILE B* is NUCLEOPHILE B in with 0.5% ADDITIVE A and 0.1% CATALYST A in n-butyl acetate (70% solids).
NUCLEOPHILE B** is NUCLEOPHILE B in n-butyl acetate (70% solids).

TABLE VI

| | | MEK solvent Rubs | |
|---|---|---|---|
| Sample | Conditions | Crosshatch Tape Peel | First Abrasion | Failure to substrate |
| 1 | No Catalyst - Room Temp. | Pass | 5 | 10 |
| 2 | No Catalyst - 1 day 60° C. | Pass | 10 | 15 |
| 3 | No Catalyst - 1 day 60° C. | Pass | 10 | 20 |
| 4 | CATALYST A - 1 day 60° C. | Pass | 10 | 20 |
| 5 | CATALYST A - 1 day 60° C. | Pass | 10 | 20 |
| 6 | CATALYST C - 1 day 60° C. | Pass | 10 | 30 |
| 7 | CATALYST C - 1 day 60° C. | Pass | 10 | 20 |
| 8 | CATALYST B - 1 day 60° C. | Pass | 10 | 20 |
| 9 | CATALYST B - 1 day 60° C. | Pass | 10 | 20 |

FIG. 1 is an illustration of 3° König Pendulum Hardness at the conditions listed in Table VII below. The samples were cured for 18 hours at 60° C. As can be appreciated by reference to Table VII and FIG. 1, the sample coating hardness increased as a function of the increased curing temperature (60° C. vs. Room Temp). That increased hardness was further improved by the addition of catalysts B, A, and D.

TABLE VII

| Sample | Catalyst | Test 1 | Test 2 | Test 3 | Avg. | Std. Dev. |
|---|---|---|---|---|---|---|
| 1 | CATALYST B | 87 | 83 | 96 | 88.67 | 5.44 |
| 2 | CATALYST B | 83 | 66 | 61 | 70.00 | 9.42 |
| 3 | CATALYST A | 77 | 77 | 87 | 80.33 | 4.71 |
| 4 | CATALYST A | 92 | 84 | 94 | 90.00 | 4.32 |
| 5 | CATALYST D | 80 | 69 | 47 | 65.33 | 13.72 |
| 6 | CATALYST D | 65 | 59 | 62 | 62.00 | 2.45 |

Tack, smear, and mar assessments were done by hand using a cotton swab; "tack" was defined by touching the cotton swab to the surface and pulling it back up to determine if there was any resistance. No resistance=no "tack"; this was a qualitative "pass/fail" test. Mar and smear were observed by rubbing the dry cotton swab across the surface—if the cotton tip abraded the surface, it was termed "mar". If it physically moved the coating like a liquid, it was termed "smear."

Figure 2:
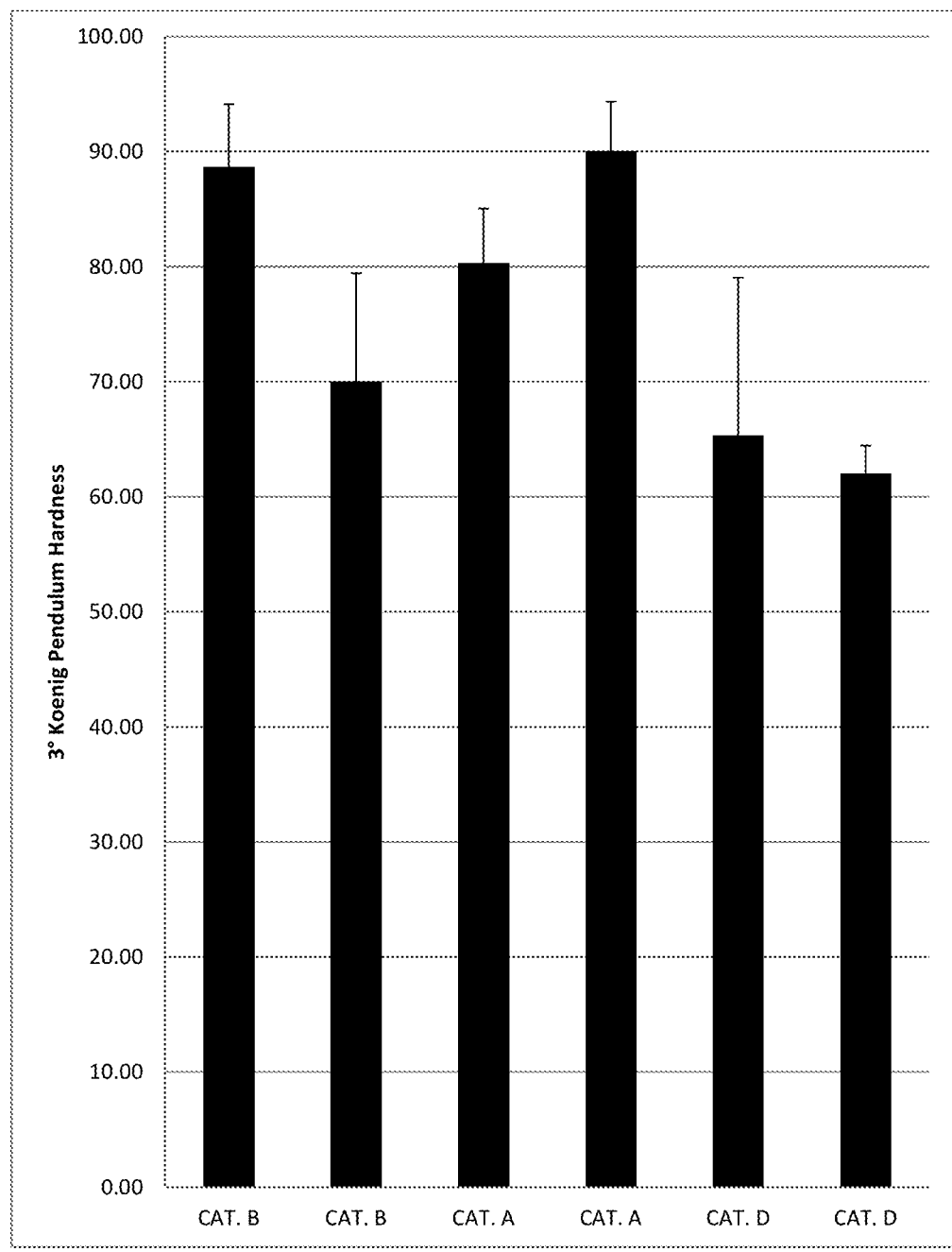
FIG. 2 illustrates pendulum hardness versus cure conditions for a coating made from vanillin.

FIG. 2 is an illustration of pendulum hardness versus cure conditions. As can be appreciated by reference to FIG. 2, the sample coating hardness was improved using catalyst B or A, preferentially over catalyst D.

Based on their initial performance using the above metrics, two chemistries (vanillin-based and α-ketoamide-based) showed promise as potential crosslinking systems with ISOCYANATE A.

Figure 3C:
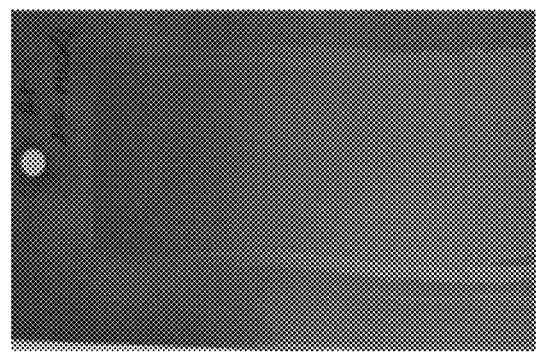
FIG. 3C illustrates the hardness and solvent resistance with α-ketoamide chemistry.
Figure 3B:
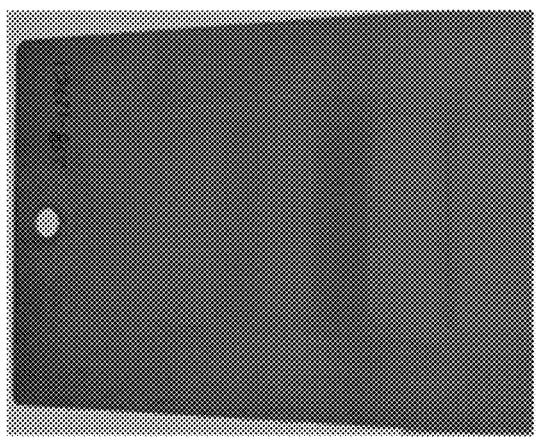
FIG. 3B illustrates the hardness and solvent resistance with α-ketoamide chemistry.
Figure 3A:
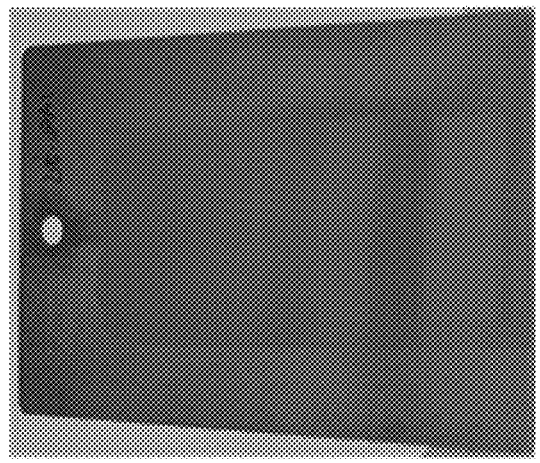
FIG. 3A illustrates the hardness and solvent resistance with α-ketoamide chemistry.

Hardness and solvent resistance were noticeably better with α-ketoamide-based chemistry as illustrated in Table VIII (data taken from FIGS. 3A, 3B, and 3C).

TABLE VIII

| Sample | Surface tack | smear | mar | MEK rubs | Tape peel |
|---|---|---|---|---|---|
| Room Temp. for 18 hours | | | | | |
| CATALYST B | N | N | Y | 3 | Pass |
| CATALYST B | N | N | Y | 3 | Pass |
| CATALYST A | N | N | Y | 3 | Pass |
| CATALYST A | N | N | Y | 3 | Pass |
| CATALYST D | N | N | Y | 2 | Pass |
| CATALYST D | N | N | Y | 3 | Pass |
| 60° C. 18 hours | | | | | |
| CATALYST B | N | N | Y | 14 | Pass |
| CATALYST B | N | N | Y | 16 | Pass |
| CATALYST A | N | N | light | 30 | Pass |
| CATALYST A | N | N | light | 32 | Pass |
| CATALYST D | N | N | Y | 10 | Pass |
| CATALYST D | N | N | Y | 15 | Pass |

Color and de-wetting were determined by visual inspection. Color was subjectively measured versus the substrate, to answer the following questions: (1) was the coating clear or hazy? (2) did the coating have a noticeable color (typically yellow, if any) versus the uncoated substrate material?

De-wetting was characterized by the presence of pinholes or other defects in surface uniformity, primarily noting their presence rather than characterizing them (size, frequency, etc.). The presence of such defects is undesirable, so that a notation of defects automatically characterizes the coating as less valuable than a coating that does not result in these types of coating defects. The coating quality (color and de-wetting behavior) was better with the vanillin-based chemistry.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant reserves the right to amend the claims during prosecution to add features as variously described in this specification, and such amendments comply with the requirements of 35 U.S.C. § 112(a), and 35 U.S.C. § 132(a).

Various aspects of the subject matter described herein are set out in the following numbered clauses:

Clause 1. A composition comprising the reaction product of a. an aliphatic diisocyanate; and b. a reactive intermediate made from one selected from the group consisting of oxazolidinones, benzoic sulfimides (saccharins), 1H-indole-2,3-diones (isatins), succinamides, N-hydroxysuccinamides, 4-hydroxy-3-methoxybenzaldehydes (vanillins), α-ketoamides, piperazines, benzofuranones, 3,4-dihydroxycyclobut-3-ene-1,2-diones (squaric acids), squaric acid esters, α-ketoamides, anilines, and α-ketoamide, phenols.

Clause 2. The composition according to Clause 1, wherein the aliphatic isocyanate has 4 to 30 carbon atoms.

Clause 3. The composition according to one of Clauses 1 and 2, wherein the aliphatic diisocyanate is selected from the group consisting of tetramethylene diisocyanate, 1,5-pentamethylene diisocyanate, 1,6-hexamethylene diisocyanate (HDI), 2,2,4-(or 2,4,4-) trimethyl-1,6-hexamethylene diisocyanate, pentamethylene diisocyanate (PDI), isophorone diisocyanate (IPDI), lysine diisocyanate, hydrogenated xylene diisocyanate, hydrogenated diphenylmethane diisocyanate, 1,4-diisocyanatocyclohexane, 1,3-bis(diisocyanatomethyl)cyclohexane, and 4,4'-dicyclohexylmethane diisocyanate.

Clause 4. The composition according to any one of Clauses 1 to 3, wherein the aliphatic diisocyanate comprises one selected from the group consisting of isocyanurates, biurets, iminooxadiazine diones, urethanes, uretdiones, carbodiimides, and allophanates.

Clause 5. The composition according to any one of Clauses 1 to 4, wherein the aliphatic diisocyanate is 1,6-hexamethylene diisocyanate (HDI).

Clause 6. The composition according to any one of Clauses 1 to 5, wherein the aliphatic diisocyanate comprises 1,6-hexamethylene diisocyanate (HDI) trimer.

Clause 7. The composition according to any one of Clauses 1 to 6, wherein the reactive intermediate is selected from the group consisting of (3-ethoxy-4-piperazin-1-yl-cyclobut-3-ene-1,2-dione hydrochloride salt), 3-ethoxy-4-[(4-hydroxyphenyl)methyl amino]cyclobut-3-ene-1,2-dione, N-[(4-aminophenyl)methyl]-2-oxo-2-phenyl-acetamide, N-[(4-hydroxyphenyl)methyl]-2-oxo-2-phenyl-acetamide, 2-oxo-2-phenyl-N-(2-piperazin-1-ylethyl)acetamide, N-(2-hydroxyethyl)-2-oxo-2-phenyl-acetamide, N-hydroxysuccinamide, and 4-hydroxy-3-methoxybenzaldehyde (vanillin).

Clause 8. The composition according to any one of Clauses 1 to 7, wherein the composition is selected from the group consisting of N-[6-[3,5-bis[6-[[4-(2-ethoxy-3,4-dioxo-cyclobuten-1-yl)piperazine-1-carbonyl]amino]hexyl]-2,4,6-trioxo-1,3,5-triazinan-1-yl]hexyl]-4-(2-ethoxy-3,4-dioxo-cyclobuten-1-yl)piperazine-1-carboxamide, 4-[[(2-ethoxy-3,4-dioxo-cyclobuten-1-yl)amino]methyl]phenyl] N-[6-[3,5-bis[6-[[4-[[(2-ethoxy-3,4-dioxo-cyclobuten-1-yl)amino]methyl]phenoxy]carbonylamino]hexyl]-2,4,6-trioxo-1,3,5-triazinan-1-yl]hexyl]carbamate, 4-[2-[(2-oxo-2-phenyl-acetyl)amino]ethyl]-N-[6-[2,4,6-trioxo-3,5-bis[6-[[4-[2-[(2-oxo-2-phenyl-acetyl)amino]ethyl]piperazine-1-carbonyl]amino]hexyl]-1,3,5-triazinan-1-yl]hexyl] piperazine-1-carboxamide, [4-[[(2-oxo-2-phenyl-acetyl)amino]methyl]phenyl] N-[6-[2,4,6-trioxo-3,5-bis[6-[[4-[[[(2-oxo-2-phenyl-acetyl)amino]methyl]phenoxy] carbonylamino]hexyl]-1,3,5-triazinan-1-yl]hexyl]carbamate, 2-oxo-2-phenyl-N-[[4-[6-[2,4,6-trioxo-3,5-bis[6-[[4-[[(2-oxo-2-phenyl-acetyl)amino]methyl]phenyl] carbamoylamino] hexyl]-1,3,5-triazinan-1-yl] hexylcarbamoylamino]phenyl]methyl]acetamide, 2-[(2-oxo-2-phenyl-acetyl)amino]ethyl N-[6-[2,4,6-trioxo-3,5-bis[6-[2-[(2-oxo-2-phenyl-acetyl)amino]ethoxycarbonyl amino]hexyl]-1,3,5-triazinan-1-yl]hexyl]carbamate, 2,5-dioxopyrrolidin-1-yl) N-[6-[3,5-bis[6-[(2,5-dioxopyrrolidin-1-yl)oxycarbonylamino]hexyl]-2,4,6-trioxo-1,3,5-triazinan-1-yl]hexyl]carbamate, and (4-formyl-2-methoxy-phenyl) N-[6-[3,5-bis[6-[(4-formyl-2-methoxy-phenoxy)carbonylamino]hexyl]-2,4,6-trioxo-1,3,5-triazinan-1-yl]hexyl] carbamate.

Clause 9. A curable composition comprising the reaction product of the composition according to any one of Clauses 1 to 8 and a nucleophile in the presence of a catalyst.

Clause 10. The curable composition according to Clause 9, wherein the nucleophile is selected from the group consisting of an amine and a polyol.

Clause 11. The curable composition according to Clause 10, wherein the amine is an aspartic ester functional amine.

Clause 12. The curable composition according to Clause 10 wherein the amine is a polyoxypropylene triamine.

Clause 13. The curable composition according to Clause 10, wherein the polyol is a hydroxy-functional acrylic polyol.

Clause 14. The curable composition according to any one of Clauses 9 to 13, wherein the curable composition is selected from the group consisting of a coatings, adhesives, sealants, castings, composites, and films.

Clause 15. The curable composition according to any one of Clauses 9 to 14, wherein the catalyst is selected from the group consisting of dibutyltin dilaurate, p-toluenesulfonic acid, 1,4-diazabicyclo[2.2.2]octane, and zinc neodecanoate.

Clause 16. A substrate having applied thereto the curable composition according to any one of Clauses 9 to 15.

Clause 17. A process of making one of a coating, an adhesive, a casting, a composite, a sealant, and a film, the process comprising reacting the composition according to any one of Clauses 1 to 8 with a nucleophile in the presence of a catalyst.

Clause 18. The process according to Clause 17, wherein the nucleophile is selected from the group consisting of an amine and a polyol.

Clause 19. The process according to Clause 18, wherein the amine is an aspartic ester functional amine.

Clause 20. The process according to Clause 18, wherein the amine is a polyoxypropylene triamine.

Clause 21. The process according to Clause 18, wherein the polyol is a hydroxy-functional acrylic polyol.

Clause 22. The composition according to Clause 1, wherein the reaction product comprises N-[6-[3,5-bis[6-[[4-(2-ethoxy-3,4-dioxo-cyclobuten-1-yl)piperazine-1-carbonyl]amino]hexyl]-2,4,6-trioxo-1,3,5-triazinan-1-yl]hexyl]-4-(2-ethoxy-3,4-dioxo-cyclobuten-1-yl)piperazine-1-carboxamide (Formula II),

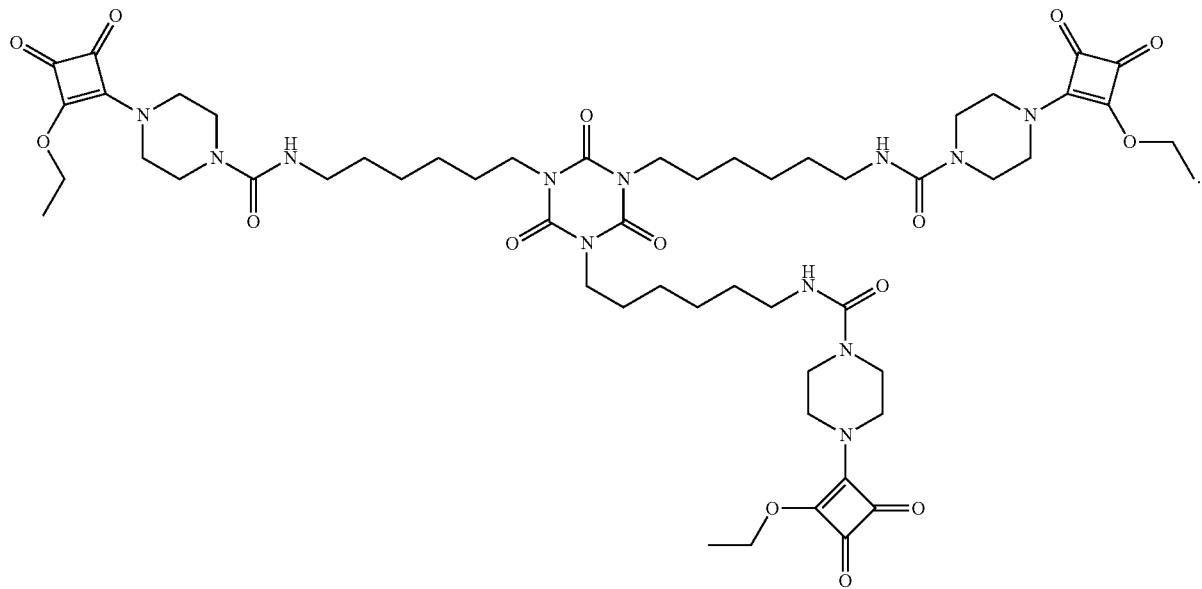
Clause 23. The composition according to Clause 1, wherein the reaction product comprises [4-[[(2-ethoxy-3,4-dioxo-cyclobuten-1-yl)amino]methyl]phenyl] N-[6-[3,5-bis [6-[[4-[[(2-ethoxy-3,4-dioxo-cyclobuten-1-yl)amino] methyl]phenoxy]carbonylamino]hexyl]-2,4,6-trioxo-1,3,5-triazinan-1-yl]hexyl]carbamate (Formula III),
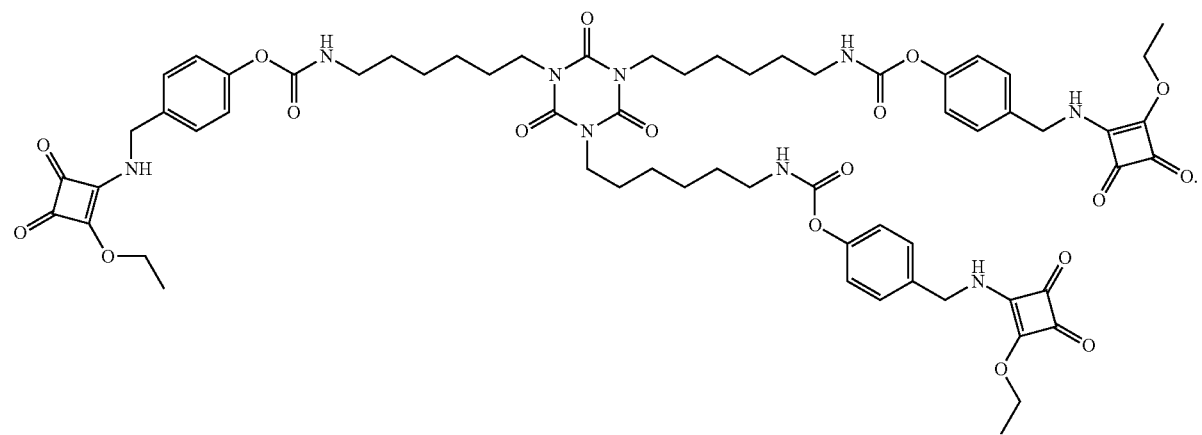

Clause 24. The composition according to Clause 1, wherein the reaction product comprises 4-[2-[(2-oxo-2-phenyl-acetyl)amino]ethyl]-N-[6-[2,4,6-trioxo-3,5-bis[6-[[4-[2-[(2-oxo-2-phenyl-acetyl)amino]ethyl]piperazine-1-carbonyl]amino]hexyl]-1,3,5-triazinan-1-yl]hexyl]piperazine-1-carboxamide (Formula IV),

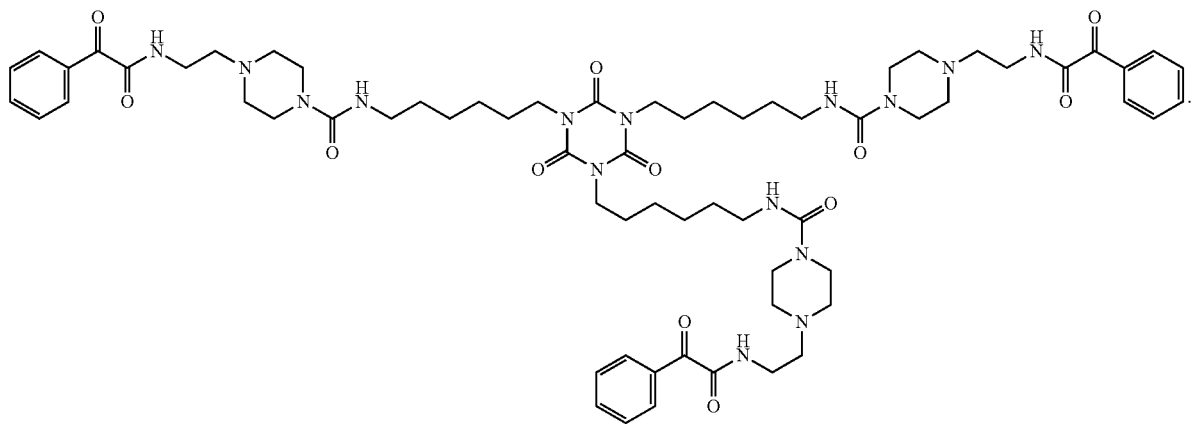

(IV)

Clause 25. The composition according to Clause 1, wherein the reaction product comprises [4-[[(2-oxo-2-phenyl-acetyl)amino]methyl]phenyl] N-[6-[2,4,6-trioxo-3,5-bis[6-[[4-[[(2-oxo-2-phenyl-acetyl)amino]methyl]phenoxy]carbonylamino]hexyl]-1,3,5-triazinan-1-yl]hexyl]carbamate, (Formula V),

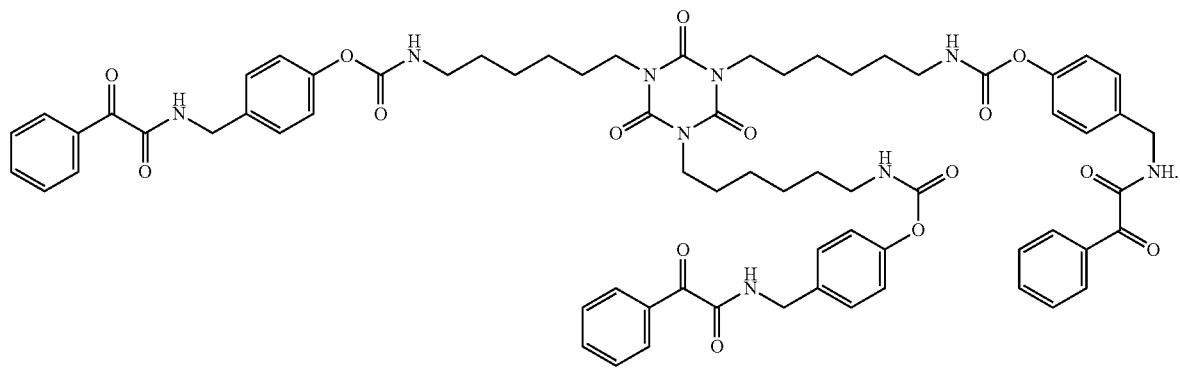

(V)

Clause 26. The composition according to Clause 1, wherein the reaction product comprises 2-oxo-2-phenyl-N-[[4-[6-[2,4,6-trioxo-3,5-bis[6-[[4-[[(2-oxo-2-phenyl-acetyl)amino]methyl]phenyl]carbamoylamino] hexyl]-1,3,5-triazinan-1-yl]hexylcarbamoylamino]phenyl]methyl]acetamide (Formula VI),

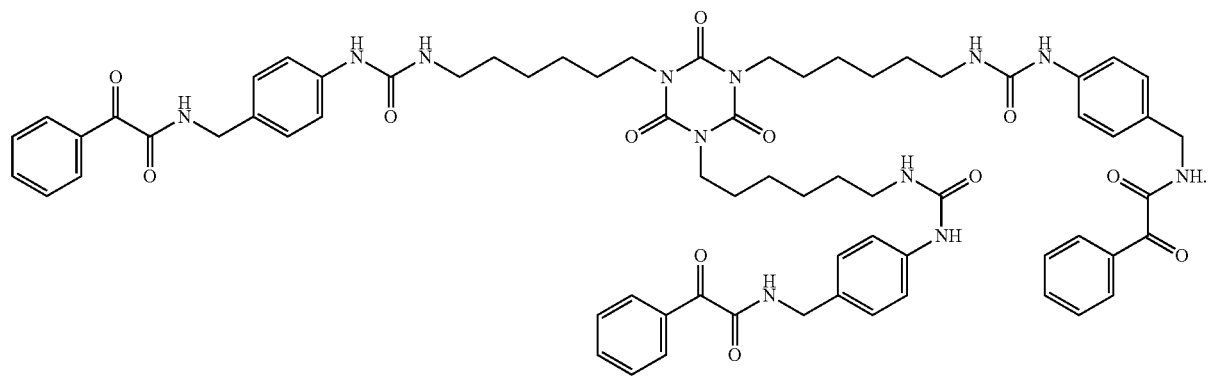

(VI)

Clause 27. The composition according to Clause 1, wherein the reaction product comprises 2-[(2-oxo-2-phenyl-acetyl)amino]ethyl N-[6-[2,4,6-trioxo-3,5-bis[6-[2-[(2-oxo-2-phenyl-acetyl)amino]ethoxycarbonyl amino]hexyl]-1,3,5-triazinan-1-yl]hexyl]carbamate (Formula VII),

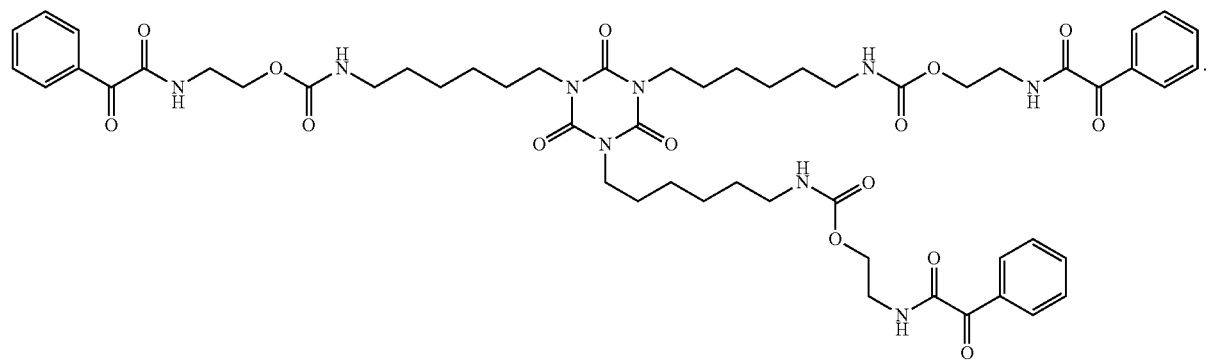

(VII)

Clause 28. The composition according to Clause 1, wherein the reaction product comprises 2,5-dioxopyrrolidin-1-yl) N-[6-[3,5-bis[6-[(2,5-dioxopyrrolidin-1-yl)oxycarbonylamino]hexyl]-2,4,6-trioxo-1,3,5-triazinan-1-yl]hexyl] carbamate (Formula VIII),

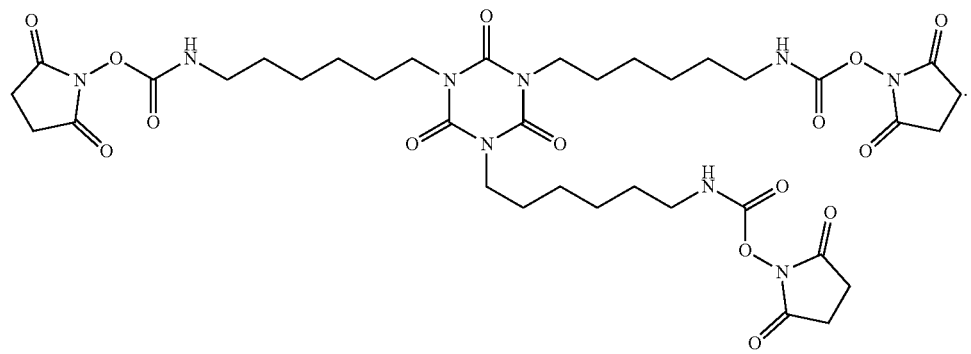

(VIII)

Clause 29. The composition according to Clause 1, wherein the reaction product comprises (4-formyl-2-methoxy-phenyl) N-[6-[3,5-bis[6-[(4-formyl-2-methoxy-phenoxy)carbonylamino]hexyl]-2,4,6-trioxo-1,3,5-triazinan-1-yl]hexyl]carbamate (Formula IX),

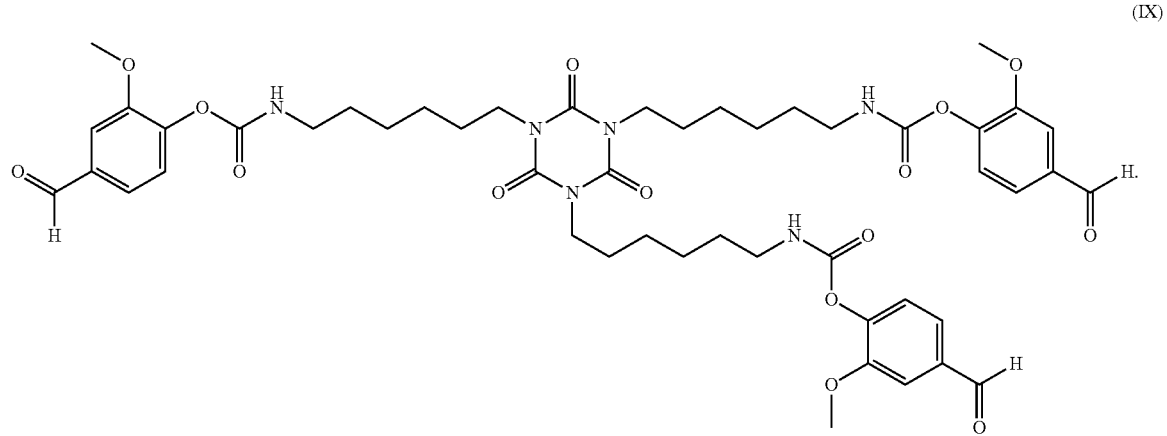

Clause 30. A curable composition comprising the reaction product of N-[6-[3,5-bis[6-[[4-(2-ethoxy-3,4-dioxo-cyclobuten-1-yl)piperazine-1-carbonyl]amino]hexyl]-2,4,6-trioxo-1,3,5-triazinan-1-yl]hexyl]-4-(2-ethoxy-3,4-dioxo-cyclobuten-1-yl)piperazine-1-carboxamide (Formula II),

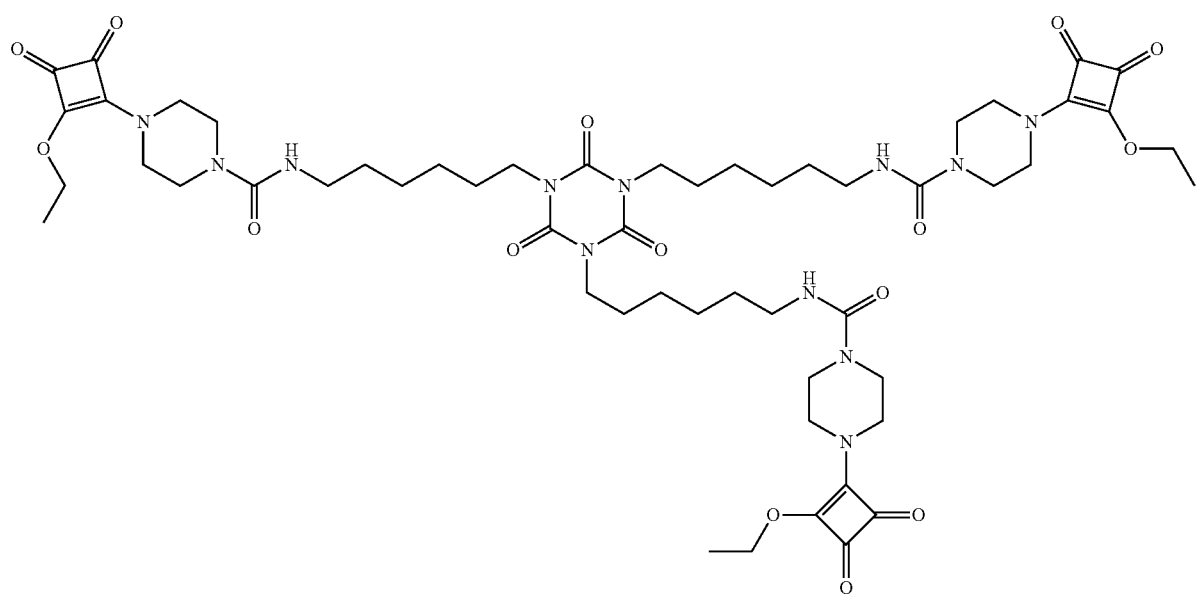

and a nucleophile in the presence of a catalyst.

Clause 31. A curable composition comprising the reaction product of [4-[[(2-ethoxy-3,4-dioxo-cyclobuten-1-yl)amino]methyl]phenyl] N-[6-[3,5-bis[6-[[4-[[(2-ethoxy-3,4-dioxo-cyclobuten-1-yl)amino]methyl]phenoxy]carbonylamino]hexyl]-2,4,6-trioxo-1,3,5-triazinan-1-yl]hexyl] carbamate (Formula III),

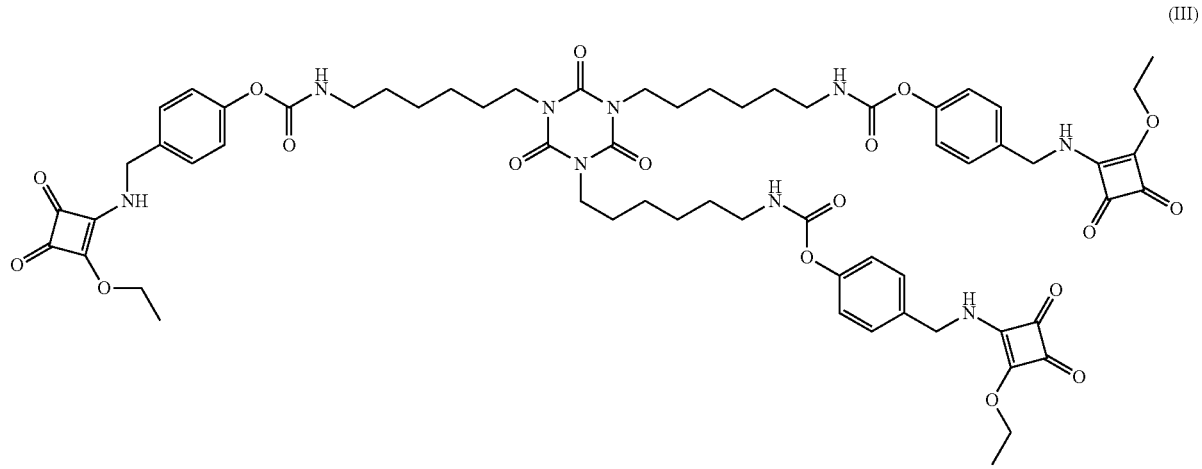 [SMILES: CCOc1c(NCc2ccc(OC(=O)NCCCCCCn3c(=O)n(CCCCCCNC(=O)Oc4ccc(CNc5c(OCC)c(=O)c5=O)cc4)c(=O)n(CCCCCCNC(=O)Oc4ccc(CNc5c(OCC)c(=O)c5=O)cc4)c3=O)cc2)c(=O)c1=O]

(III)

and a nucleophile in the presence of a catalyst.

Clause 32. A curable composition comprising the reaction product of 4-[2-[(2-oxo-2-phenyl-acetyl)amino]ethyl]-N-[6-[2,4,6-trioxo-3,5-bis[6-[[4-[2-[(2-oxo-2-phenyl-acetyl)amino]ethyl]piperazine-1-carbonyl]amino]hexyl]-1,3,5-triazinan-1-yl]hexyl]piperazine-1-carboxamide (Formula IV),

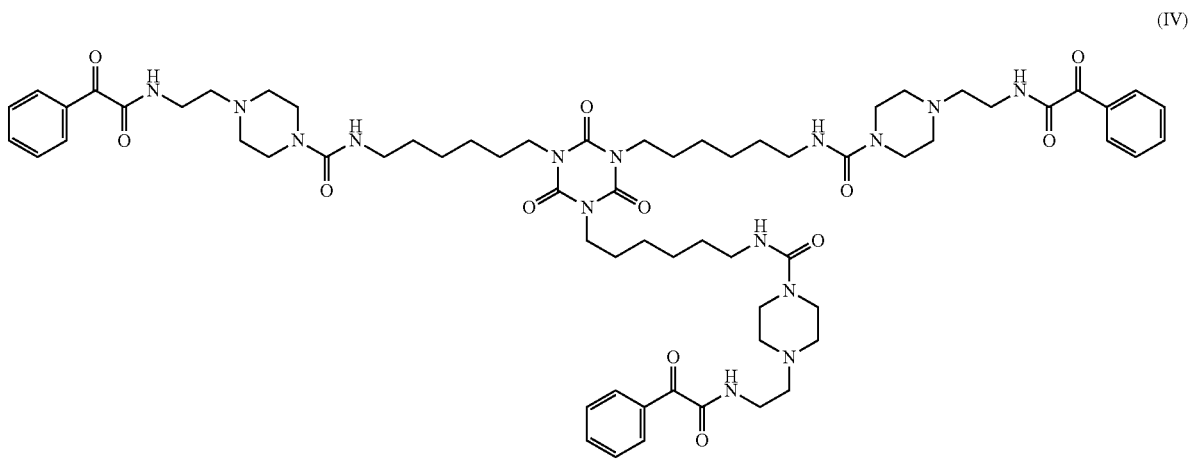 [SMILES: O=C(NCCN1CCN(C(=O)NCCCCCCn2c(=O)n(CCCCCCNC(=O)N3CCN(CCNC(=O)C(=O)c4ccccc4)CC3)c(=O)n(CCCCCCNC(=O)N3CCN(CCNC(=O)C(=O)c4ccccc4)CC3)c2=O)CC1)C(=O)c1ccccc1]

(IV)

and a nucleophile in the presence of a catalyst.

Clause 33. A curable composition comprising the reaction product of [4-[[(2-oxo-2-phenyl-acetyl)amino]methyl]phenyl] N-[6-[2,4,6-trioxo-3,5-bis[6-[[4-[[(2-oxo-2-phenyl-acetyl)amino]methyl]phenoxy]carbonylamino]hexyl]-1,3,5-triazinan-1-yl]hexyl]carbamate, (Formula V),

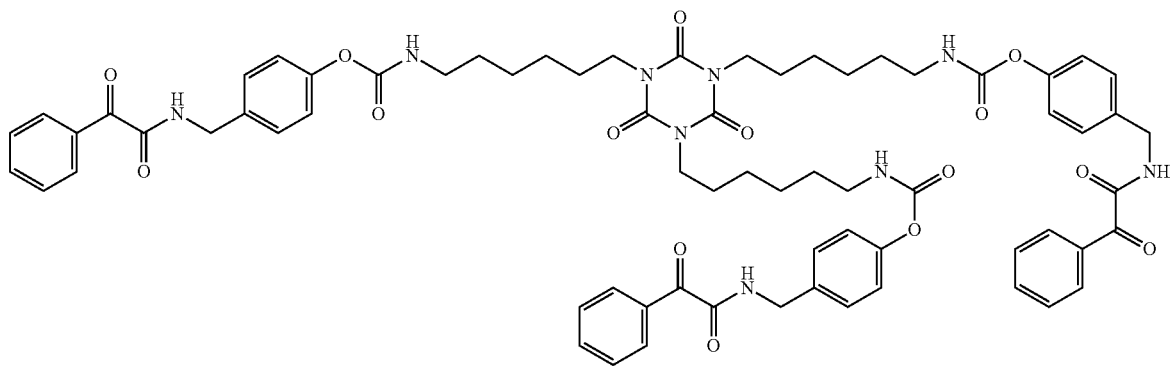

(V)

and a nucleophile in the presence of a catalyst.

Clause 34. A curable composition comprising the reaction product of 2-oxo-2-phenyl-N-[[4-[6-[2,4,6-trioxo-3,5-bis[6-[[4-[[(2-oxo-2-phenyl-acetyl)amino]methyl]phenyl]carbamoylamino] hexyl]-1,3,5-triazinan-1-yl]hexylcarbamoylamino]phenyl]methyl]acetamide (Formula VI),

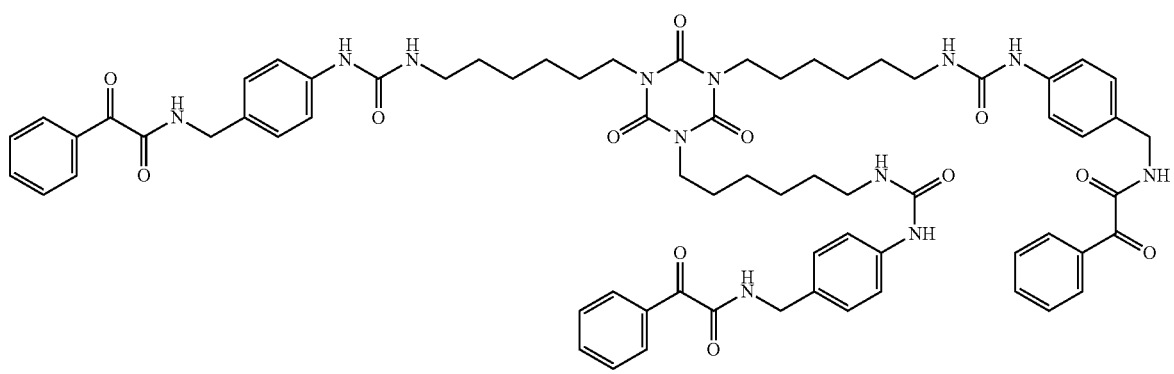

(VI)

and a nucleophile in the presence of a catalyst.

Clause 35. A curable composition comprising the reaction product of 2-[(2-oxo-2-phenyl-acetyl)amino]ethyl N-[6-[2,4,6-trioxo-3,5-bis[6-[2-[(2-oxo-2-phenyl-acetyl)amino]ethoxycarbonyl amino]hexyl]-1,3,5-triazinan-1-yl]hexyl] carbamate (Formula VII),

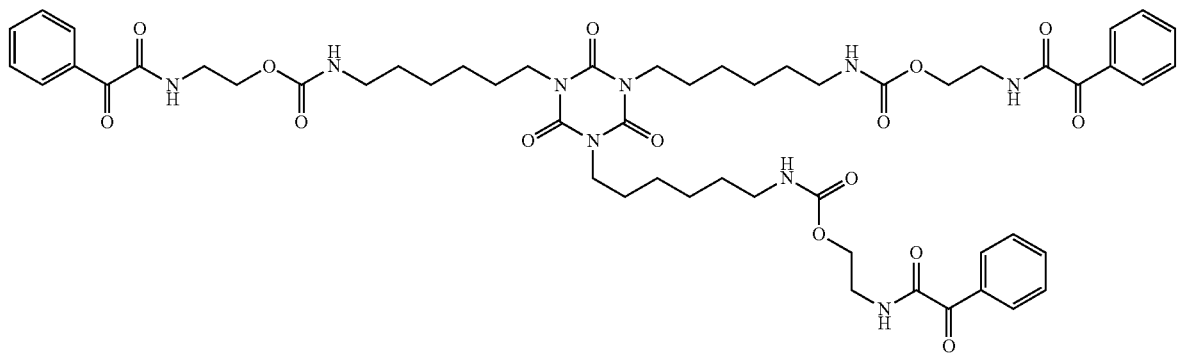

and a nucleophile in the presence of a catalyst.

Clause 36. A curable composition comprising the reaction product of 2,5-dioxopyrrolidin-1-yl) N-[6-[3,5-bis[6-[(2,5-dioxopyrrolidin-1-yl)oxycarbonylamino]hexyl]-2,4,6-trioxo-1,3,5-triazinan-1-yl]hexyl]carbamate (Formula VIII),

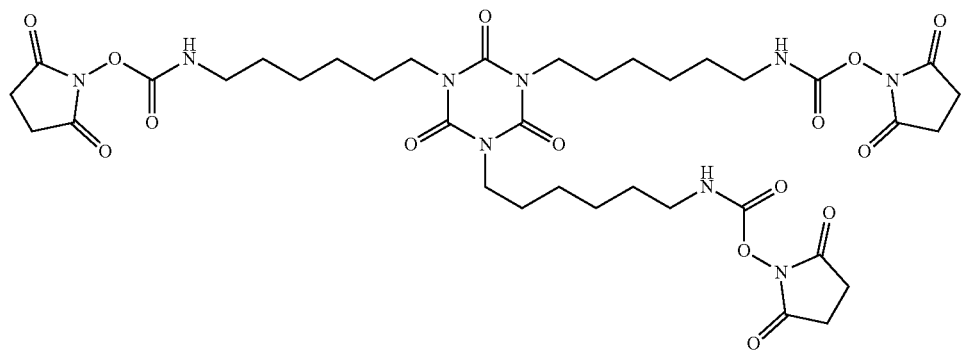

and a nucleophile in the presence of a catalyst.

Clause 37. A curable composition comprising the reaction product of (4-formyl-2-methoxy-phenyl) N-[6-[3,5-bis[6-[(4-formyl-2-methoxy-phenoxy)carbonylamino]hexyl]-2,4,6-trioxo-1,3,5-triazinan-1-yl]hexyl]carbamate (Formula IX),

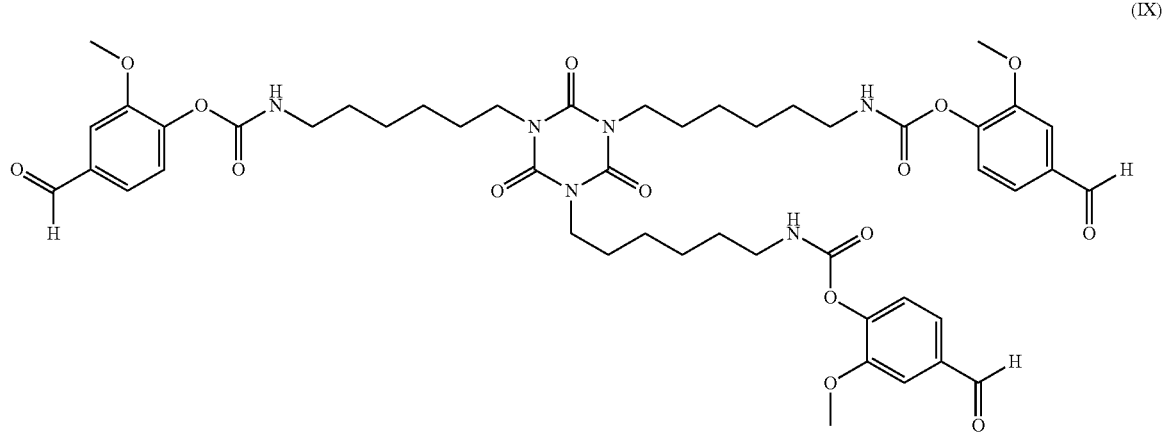 [SMILES: COc1cc(C=O)ccc1OC(=O)NCCCCCCn1c(=O)n(CCCCCCNC(=O)Oc2ccc(C=O)cc2OC)c(=O)n(CCCCCCNC(=O)Oc2ccc(C=O)cc2OC)c1=O]

and a nucleophile in the presence of a catalyst.

Clause 38. A process of applying the curable composition according to any one of Clauses 30 to 37 to a substrate, wherein the process comprises at least one of spraying, dipping, flow coating, rolling, brushing, and pouring.

Clause 39. A substrate having applied thereto the curable composition according to any one of Clauses 30 to 37.

Clause 40. A composition comprising the reaction product of a diisocyanate and 3-ethoxy-4-piperazin-1-yl-cyclobut-3-ene-1,2-dione hydrochloride salt (Formula RI-1),

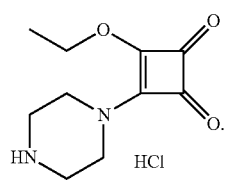

Clause 41. A composition comprising the reaction product of a diisocyanate and 3-ethoxy-4-[(4-hydroxyphenyl)methyl amino]cyclobut-3-ene-1,2-dione (Formula RI-2),

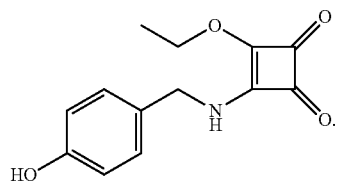

Clause 42. A composition comprising the reaction product of a diisocyanate and N-[(4-aminophenyl)methyl]-2-oxo-2-phenyl-acetamide (Formula RI-3),

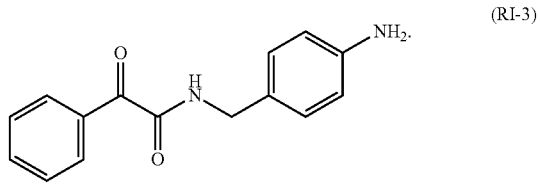 [SMILES: Nc1ccc(CNC(=O)C(=O)c2ccccc2)cc1]

Clause 43. A composition comprising the reaction product of a diisocyanate and N-[(4-hydroxyphenyl)methyl]-2-oxo-2-phenyl-acetamide (Formula RI-4),

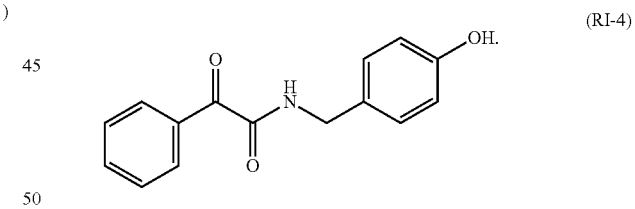

Clause 44. A composition comprising the reaction product of a diisocyanate and 2-oxo-2-phenyl-N-(2-piperazin-1-yl-ethyl)acetamide (Formula RI-5),

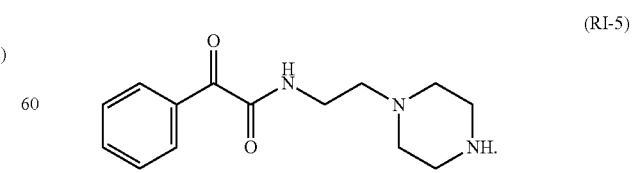

Clause 45. A composition comprising the reaction product of a diisocyanate and N-(2-hydroxyethyl)-2-oxo-2-phenyl-acetamide (Formula RI-6),

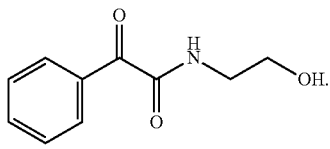

(RI-6)

What is claimed is:

1. A composition comprising the reaction product of
   a. at least one of a prepolymer, oligomer or monomer selected from the group consisting of aliphatic diisocyanates, isocyanurates, biurets, iminooxadiazine diones, urethanes, uretdiones, carbodiimides, and allophanates; and
   b. a reactive intermediate made from a-ketoamides and piperazines, α-ketoamides and anilines, or α-ketoamides and phenols.

2. The composition according to claim 1, wherein the prepolymer, oligomer or monomer has 4 to 30 carbon atoms.

3. The composition according to claim 1, wherein the prepolymer, oligomer or monomer is selected from the group consisting of tetramethylene diisocyanate, 1,6-hexamethylene diisocyanate (HDI), 2,2,4- (or 2,4,4-) trimethyl-1,6-hexamethylene diisocyanate, pentamethylene diisocyanate (PDI), isophorone diisocyanate (IPDI), lysine diisocyanate, hydrogenated xylene diisocyanate, hydrogenated diphenylmethane diisocyanate, 1,4-diisocyanatocyclohexane, 1,3-bis(diisocyanatomethyl)cyclohexane, and 4,4'-dicyclohexylmethane diisocyanate.

4. The composition according to claim 1, wherein the prepolymer, oligomer or monomer comprises one selected from the group consisting of isocyanurates, biurets, and iminooxadiazine diones.

5. The composition according to claim 1, wherein the prepolymer, oligomer or monomer comprises 1,6-hexamethylene diisocyanate (HDI) trimer.

6. A composition comprising a reaction product is-selected from the group consisting of N-[6-[3,5-bis[6-[[4-(2-ethoxy-3,4-dioxo-cyclobuten-1-yl)piperazine-1-carbonyl]amino]hexyl]-2,4,6-trioxo-1,3,5-triazinan-1-yl]hexyl]-4-(2-ethoxy-3,4-dioxo-cyclobuten-1-yl)piperazine-1-carboxamide, 4-[[(2-ethoxy-3,4-dioxo-cyclobuten-1-yl)amino]methyl]phenyl]N-[6-[3,5-bis[6-[[4-[[(2-ethoxy-3,4-dioxo-cyclobuten-1-yl)amino]methyl]phenoxy]carbonylamino]hexyl]-2,4,6-trioxo-1,3,5-triazinan-1-yl]hexyl]carbamate, 4-[2-[(2-oxo-2-phenyl-acetyl)amino]ethyl]-N-6-[2,4,6-trioxo-3,5-bis[6-[[4-[2-[(2-oxo-2-phenyl-acetyl)amino]ethyl]piperazine-1-carbonyl]amino]hexyl]-1,3,5-triazinan-1-yl]hexyl]piperazine-1-carboxamide, [4-[[(2-oxo-2-phenyl-acetyl)amino]methyl]phenyl]N-[6-[2,4,6-trioxo-3,5-bis[6-[[4-[[(2-oxo-2-phenyl-acetyl)amino]methyl]phenoxy]carbonylamino]hexyl]-1,3,5-triazinan-1-yl]hexyl]carbamate, 2-oxo-2-phenyl-N-[[4-[6-[2,4,6-trioxo-3,5-bis[6-[[4-[[(2-oxo-2-phenyl-acetyl)amino]methyl]phenyl]carbamoylamino]hexyl]-1,3,5-triazinan-1-yl]hexylcarbamoylamino]phenyl]methyl]acetamide, 2-[(2-oxo-2-phenyl-acetyl)amino]ethyl N-[6-[2,4,6-trioxo-3,5-bis[6-[2-[(2-oxo-2-phenyl-acetyl)amino]ethoxycarbonyl amino]hexyl]-1,3,5-triazinan-1-yl]hexyl]carbamate, and (4-formyl-2-methoxy-phenyl) N-[6-[3,5-bis[6-[(4-formyl-2-methoxy-phenoxy)carbonylamino]hexyl]-2,4,6-trioxo-1,3,5-triazinan-1-yl]hexyl]carbamate.

7. A curable composition comprising the reaction product of the composition according to claim 1 and a nucleophile in the presence of a catalyst.

8. A curable composition comprising the reaction product of the composition according to claim 6 and a nucleophile in the presence of a catalyst.

9. The curable composition according to claim 7, wherein the nucleophile is selected from the group consisting of an amine and a polyol.

10. The curable composition according to claim 9, wherein the amine is an aspartic ester functional amine.

11. The curable composition according to claim 9, wherein the amine is a polyoxypropylene triamine.

12. The curable composition according to claim 9, wherein the polyol is a hydroxy-functional acrylic polyol.

13. The curable composition according to claim 7, wherein the curable composition is selected from the group consisting of a coatings, adhesives, sealants, castings, composites, and films.

14. The curable composition according to claim 7, wherein the catalyst is selected from the group consisting of dibutyltin dilaurate, p-toluenesulfonic acid, 1,4-diazabicyclo[2.2.2]octane, and zinc neodecanoate.

15. A process of making one of a coating, an adhesive, a casting, a composite, a sealant, and a film, the process comprising reacting the composition according to claim 1 with a nucleophile in the presence of a catalyst.

16. The process according to claim 15, wherein the nucleophile is selected from the group consisting of an amine and a polyol.

17. The process according to claim 16, wherein the amine is an aspartic ester functional amine.

18. The process according to claim 16, wherein the amine is a polyoxypropylene triamine.

19. The process according to claim 16, wherein the polyol is a hydroxy-functional acrylic polyol.

20. A substrate having applied thereto the curable composition according to claim 7.

21. A substrate having applied thereto the curable composition according to claim 8.

* * * * *